(12) United States Patent
Sakuma et al.

(10) Patent No.: US 10,434,942 B2
(45) Date of Patent: Oct. 8, 2019

(54) DRIVING ASSISTANCE DEVICE

(71) Applicant: DENSO CORPORATION, Kariya, Aichi-pref. (JP)

(72) Inventors: Yasushi Sakuma, Kariya (JP); Hiroyuki Okuno, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1 day.

(21) Appl. No.: 15/744,294

(22) PCT Filed: Sep. 30, 2016

(86) PCT No.: PCT/JP2016/079164
§ 371 (c)(1),
(2) Date: Jan. 12, 2018

(87) PCT Pub. No.: WO2017/057755
PCT Pub. Date: Apr. 6, 2017

(65) Prior Publication Data
US 2018/0201188 A1    Jul. 19, 2018

(30) Foreign Application Priority Data

Sep. 30, 2015  (JP) ................. 2015-193767
Apr. 13, 2016  (JP) ................. 2016-080572

(51) Int. Cl.
*B60Q 9/00* (2006.01)
*G01P 15/08* (2006.01)
(Continued)

(52) U.S. Cl.
CPC ............... *B60Q 9/008* (2013.01); *B60T 7/22* (2013.01); *B60T 8/00* (2013.01); *B60T 8/17* (2013.01);
(Continued)

(58) Field of Classification Search
CPC . B60T 8/172; B60T 17/22; B60T 7/22; B60T 8/00; B60T 8/17; B60T 7/042;
(Continued)

(56) References Cited

U.S. PATENT DOCUMENTS

2003/0060936 A1* 3/2003 Yamamura ........... B60K 26/021
  701/1
2007/0021876 A1* 1/2007 Isaji ..................... B60K 28/066
  701/1
(Continued)

FOREIGN PATENT DOCUMENTS

JP   2011043976 A   3/2011
JP   2011123618 A   6/2011
(Continued)

*Primary Examiner* — Behrang Badii
(74) *Attorney, Agent, or Firm* — Harness, Dickey & Pierce, P.L.C.

(57) ABSTRACT

A driving assistance device includes a deceleration detection unit, an information calculation unit, and an index calculation unit. The information calculation unit obtains at least one type of front information including a time to collision until an own vehicle collides with a preceding vehicle, a time headway until the own vehicle reaches a position of the preceding vehicle, and a following distance between the own vehicle and the preceding vehicle when the own vehicle stops, after a deceleration start of the own vehicle. The index calculation unit obtains an index indicating a driving characteristic that is a characteristic of a driving operation of a driver, based on the front information.

15 Claims, 16 Drawing Sheets

(51) Int. Cl.
*G01S 13/08* (2006.01)
*G01S 13/93* (2006.01)
*G08G 1/16* (2006.01)
*B60W 50/14* (2012.01)
*B60W 40/107* (2012.01)
*B60W 30/095* (2012.01)
*B60W 30/16* (2012.01)
*B60W 30/17* (2012.01)
*B60W 40/09* (2012.01)
*B60T 7/22* (2006.01)
*B60T 8/00* (2006.01)
*B60T 8/17* (2006.01)
*G05D 1/00* (2006.01)
*B60T 7/14* (2006.01)
*B60T 17/22* (2006.01)
*B60T 8/172* (2006.01)
*B60K 28/06* (2006.01)
*B60T 7/04* (2006.01)

(52) U.S. Cl.
CPC .......... *B60W 30/095* (2013.01); *B60W 30/16* (2013.01); *B60W 30/17* (2013.01); *B60W 40/09* (2013.01); *B60W 40/107* (2013.01); *B60W 50/14* (2013.01); *G01P 15/0802* (2013.01); *G01S 13/08* (2013.01); *G01S 13/931* (2013.01); *G08G 1/16* (2013.01); *G08G 1/166* (2013.01); *B60K 28/066* (2013.01); *B60T 7/042* (2013.01); *B60T 7/14* (2013.01); *B60T 8/172* (2013.01); *B60T 17/22* (2013.01); *B60T 2201/022* (2013.01); *B60W 30/0953* (2013.01); *B60W 2520/10* (2013.01); *B60W 2520/105* (2013.01); *B60W 2540/12* (2013.01); *B60W 2550/302* (2013.01); *B60W 2550/308* (2013.01); *G01S 2013/9357* (2013.01); *G05D 1/00* (2013.01)

(58) Field of Classification Search
CPC ...... B60T 2201/022; B60T 7/14; B60T 17/18; B60K 28/066; B60K 26/021; B60K 31/0008; B60K 35/00; B60W 40/10; B60W 10/06; B60W 30/095; B60W 30/16; B60W 30/17; B60W 40/09; B60W 40/107; B60W 50/14; B60W 30/0953; B60W 2520/10; B60W 2520/105; B60W 2540/12; B60W 2550/302; B60W 2550/308; B60W 40/08; B60W 10/184; B60W 40/02; B60W 50/16; B60W 50/087; G05D 1/00; B60Q 9/008; G01P 15/0802; G01S 13/08; G01S 13/931; G01S 2013/9357; G08G 1/16; G08G 1/166; G08G 1/161; G08G 1/167; G06K 9/00805; B60R 1/00; B02B 27/01; B62D 15/0265; B62D 15/029

See application file for complete search history.

(56) References Cited

U.S. PATENT DOCUMENTS

| | | | |
|---|---|---|---|
| 2007/0106475 A1* | 5/2007 | Kondoh | B60K 26/021 701/301 |
| 2007/0145818 A1* | 6/2007 | Kobayashi | B60T 7/22 303/113.4 |
| 2007/0276577 A1* | 11/2007 | Kuge | B60W 10/06 701/96 |
| 2012/0010773 A1 | 1/2012 | Sakuma et al. | |
| 2015/0298676 A1* | 10/2015 | Matsumura | B60T 8/172 701/34.4 |

FOREIGN PATENT DOCUMENTS

| | | |
|---|---|---|
| JP | 2012017699 A | 1/2012 |
| JP | 2012079325 A | 4/2012 |
| JP | 2014016727 A | 1/2014 |
| JP | 2015076000 A | 4/2015 |
| JP | 2015097002 A | 5/2015 |

* cited by examiner

DRIVING ASSISTANCE DEVICE

CROSS REFERENCE TO RELATED APPLICATIONS

This application is a U.S. National Phase Application under 35 U.S.C. 371 of International Application No. PCT/JP2016/079164 filed on Sep. 30, 2016 and published in Japanese as WO 2017/057755 A1 on Apr. 6, 2017. This international application is based on and claims the benefit of priority of Japanese Patent Application No. 2015-193767 filed on Sep. 30, 2015 and Japanese Patent Application No. 2016-080572 filed on Apr. 13, 2016. The entire disclosures of all of the above applications are incorporated herein by reference.

TECHNICAL FIELD

The present disclosure relates to a driving assistance device of performing driving assistance such as notification suitable for a driving characteristic of a driver of a vehicle.

BACKGROUND ART

There have been developed various driving assistance devices for executing driving assistance for a driver who drives a vehicle, the driving assistance being suitable for the tendency of driving characteristics of the driver such as preference, habit, and ability (e.g., refer to Patent Literature 1).

PRIOR ART LITERATURES

Patent Literature

Patent Literature 1: JP-2014-16727-A

SUMMARY

However, the technique described in Patent Literature 1, for example, does not take into consideration an index of the driving characteristic for measuring whether the driver is taking a safe driving action with sufficient time in a driving situation in which the driver decelerates and stops the own vehicle following a preceding vehicle traveling in front of the own vehicle and a calculation function for calculating the index of the driving characteristic.

Thus, the inventors have found out, as a result of detailed studies, a problem that driving assistance suitable for the driving characteristic of the driver during the deceleration and stop cannot be achieved.

In one aspect of the present disclosure, it is desired to provide a technique capable of performing driving assistance suitable for the driving characteristic of the driver during the deceleration and stop of the vehicle.

A vehicle assistance device of one aspect of the present disclosure includes a deceleration detection unit, an information calculation unit, and an index calculation unit.

The deceleration detection unit detects a deceleration start by an operation of a driver of an own vehicle in a period from a deceleration to a stop of a preceding vehicle that travels in front of the own vehicle.

The information calculation unit obtains at least one type of front information including a time to collision until the own vehicle collides with the preceding vehicle, a time headway until the own vehicle reaches a position of the preceding vehicle, and a following distance between the own vehicle and the preceding vehicle when the own vehicle stops, after the deceleration start of the own vehicle.

The index calculation unit obtains an index indicating a driving characteristic that is a characteristic of a driving operation of the driver, on the basis of the front information.

According to such a configuration, it is possible to obtain the index indicating the driving characteristic that is a characteristic of a driving operation of the driver, on the basis of at least one type of front information including the time to collision, the time headway, and the following distance, after the deceleration start of the own vehicle. Thus, it is possible to perform appropriate driving assistance such as warning or advice to the driver on the basis of the index.

That is, it can be considered that, after the deceleration start by the operation of the driver of the own vehicle, the time to collision, the time to collision, and the time headway (that is, the front information) have a correlation with the driving characteristic relating to a deceleration operation such as a brake operation of the driver. Thus, it is possible to obtain the index indicating the driving characteristic on the basis of the front information.

Thus, it is possible to perform appropriate driving assistance such as warning or advice to the driver on the basis of the index.

For example, when at least one of the time to collision, the time headway, and the following distance in a driver is shorter than a normal one, it can be considered that the driver is prone to have less time to collision. Thus, for example, the safety in driving can be improved by notifying the driver of the tendency of the driving characteristic of the driver.

Figure 1:
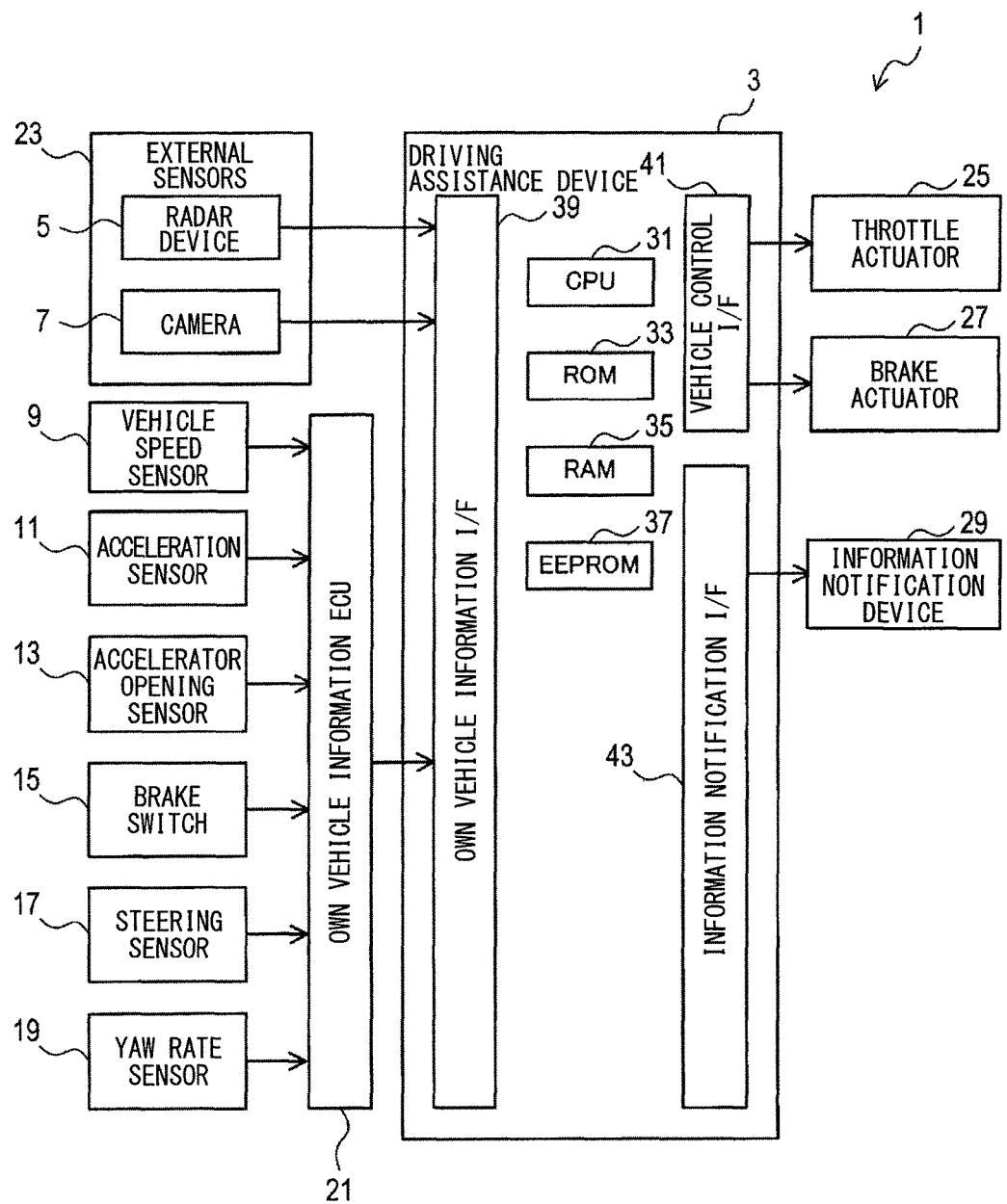
FIG. 1 is a block diagram illustrating a driving assistance system of a first embodiment.

REFERENCE SIGNS LIST 3 driving assistance device
5 radar device
9 vehicle speed sensor
15 brake switch
29 information notification device
51 first processing unit
53 second processing unit
59 sixth processing unit
61 seventh processing unit

EMBODIMENTS

Hereinbelow, exemplary embodiments of the present disclosure will be described with reference to the drawings.

1. First Embodiment 1-1. Configuration

First, a system configuration of a driving assistance device (that is, a driving assistance system) of the first embodiment will be described.

As illustrated in FIG. 1, a driving assistance system 1 according to the first embodiment assists a driver in driving a vehicle (that is, the own vehicle) and includes various devices mounted on the own vehicle.

Specifically, the driving assistance system 1 is provided with a driving assistance device 3, a radar device 5, a camera 7, a vehicle speed sensor 9, an acceleration sensor 11, an accelerator opening sensor 13, a brake switch 15, a steering sensor 17, a yaw rate sensor 19, and an own vehicle information electronic control unit 21. Hereinbelow, the radar device 5 and the camera 7 are referred to as external sensors 23, and the electronic control unit is referred to as an ECU.

Further, the driving assistance system 1 is provided with a throttle actuator 25, a brake actuator 27, and an information notification device 29.

Hereinbelow, each configuration will be described.

The driving assistance device 3 is an electronic control device such as a microcomputer provided with a CPU 31, a ROM 33, a RAM 35, an EEPROM 37, an own vehicle information interface 39, a vehicle control interface 41, and an information notification interface 43 which are known. A nonvolatile memory such as a flash memory which is capable of holding information even when power is turned off can be employed instead of the EEPROM 37.

Among these elements, the own vehicle information interface 39 is an interface that inputs information from the external sensors 23 and the own vehicle information ECU 21. Hereinbelow, the interface is referred to as I/F.

Further, the vehicle control I/F 41 is an interface that outputs various control signals for controlling the operation of the vehicle to the throttle actuator 25 and the brake actuator 27. The information notification I/F 43 is an interface for outputting information of which the driver is notified to the information notification device 29.

Various functions of the driving assistance device 3 are implemented by the CPU 31 executing programs stored in a nontransitive and substantive storage medium. In this example, the ROM 33 corresponds to the nontransitive and substantive storage medium which stores the programs. Further, a method corresponding to each program is executed by the execution of the program. Further, the driving assistance device 3 may include one or more microcomputers.

The radar device 5 is, for example, a known frequency modulated continuous wave (FMCW) device. The radar device 5 transmits a frequency-modulated radar wave in a millimeter wave band to the front side of the own vehicle and receives a reflected radar wave to detect the distance to an object that reflects the radar wave (hereinbelow, referred to as a target), a relative speed to the target, and a direction in which the target is present. The vehicle speed of the target (e.g., a preceding vehicle) can be obtained by adding the relative speed to the own vehicle speed as already known. Further, a known laser radar may be employed as the radar device 5.

Further, the radar device 5 calculates the probability that the detected target and the own vehicle are present on the same lane (that is, the own lane probability) on the basis of vehicle speed information and steering angle information indicating a curve curvature radius of the own vehicle which are received from the own vehicle information ECU 21 and the position of the detected target. The radar device 5 transmits target information including the position, the relative speed, and the own lane probability of the target to the driving assistance device 3.

The camera 7 is, for example, an image capturing device such as a CCD camera which captures an image of the front side of the own vehicle and transmits captured image data to the driving assistance device 3. As already known, it is possible to recognize a preceding vehicle and recognize a lane on which the own vehicle is traveling from the image data from the camera 7.

The vehicle speed sensor 9 is a sensor that detects the traveling speed of the own vehicle (that is, the own vehicle speed) and transmits a signal indicating the own vehicle speed to the own vehicle information ECU 21.

The acceleration sensor 11 is a sensor that detects the acceleration in the front-rear direction of the own vehicle and transmits a signal indicating the acceleration to the own vehicle information ECU 21.

The accelerator opening sensor 13 is a sensor that detects the amount by which an accelerator pedal is depressed (that is, the degree of opening of the accelerator) and transmits a signal indicating the degree of opening of the accelerator to the own vehicle information ECU 21.

The brake switch 15 is a switch that detects depression of the brake pedal by the driver, that is, start of a braking operation and transmits a signal indicating the start of the braking operation to the own vehicle information ECU 21.

The steering sensor 17 is a sensor that detects a steering angle of a steering wheel (i.e., a steering wheel) and transmits a signal indicating the steering angle to the own vehicle information ECU 21.

The yaw rate sensor 19 is a sensor that detects a yaw rate and transmits a signal indicating the yaw rate to the own vehicle information ECU 21.

The own vehicle information ECU 21 receives signals indicating the operation of the own vehicle from the vehicle speed sensor 9, the acceleration sensor 11, the accelerator opening sensor 13, the brake switch 15, the steering sensor 17, and the yaw rate sensor 19 and transmits the signals to the driving assistance device 3.

That is, the own vehicle information ECU 21 acquires information indicating a deceleration or stop of the own vehicle and information required for calculating a time to collision, i.e., TTC, and transmits these pieces of information to the driving assistance device 3.

As already known, the time to collision TTC is obtained by dividing "the current relative distance between the preceding vehicle and the own vehicle" by "the current relative speed between the preceding vehicle and the own vehicle". The time to collision TTC is a value (that is, time) indicating how much time is left until the own vehicle collides with the preceding vehicle in the current traveling state.

An example of the throttle actuator 25 is an electronic throttle. The acceleration and the vehicle speed can be controlled by controlling the operation of the electronic throttle to adjust output of an engine of the own vehicle.

An example of the brake actuator 27 is a brake circuit which controls a wheel cylinder pressure. The braking force can be controlled by controlling the operation of the brake circuit to adjust the wheel cylinder pressure.

Examples of the information notification device 29 include a display device and a speaker. The driver can be notified of warning or advice by driving the display device or the speaker.

1-2. Functional Configuration of Driving Assistance Device

Next, the configuration of the driving assistance device 3 will be functionally described.

Figure 2:
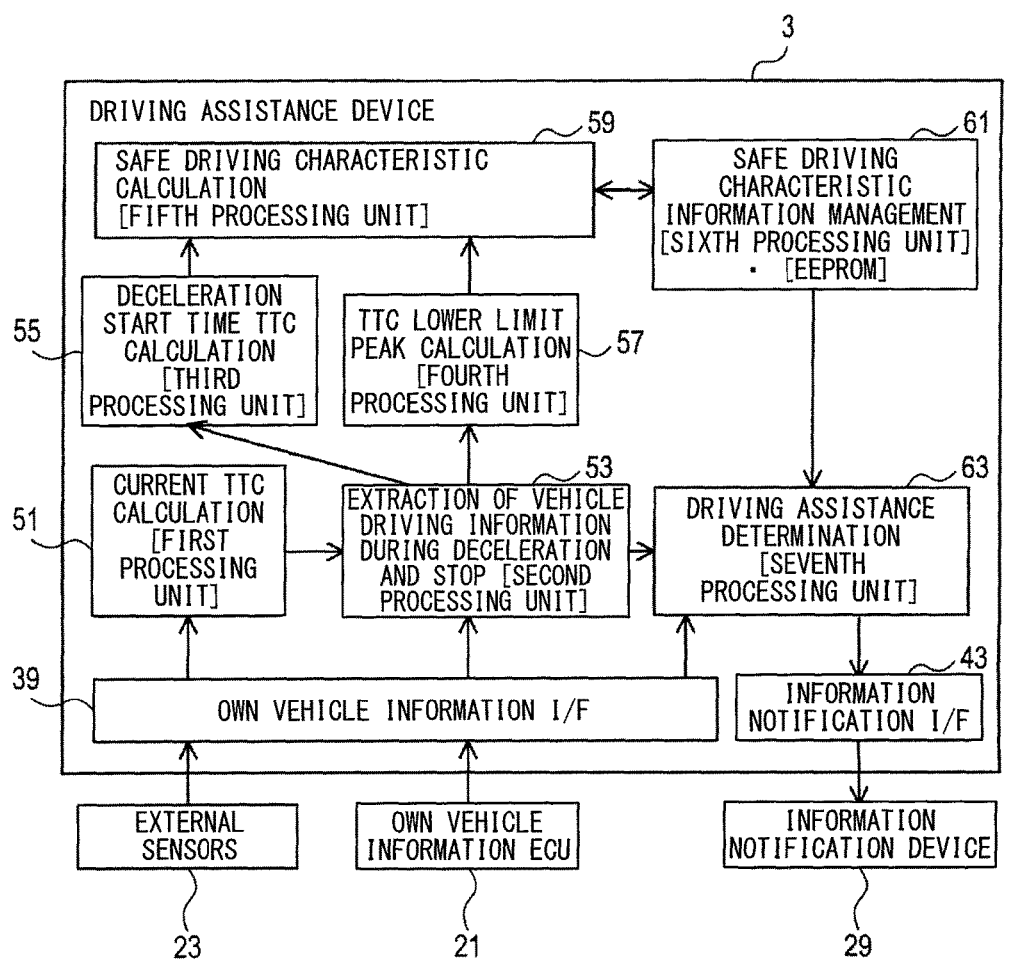
FIG. 2 is a block diagram functionally illustrating the configuration of a driving assistance device.

As illustrated in FIG. 2, the driving assistance device 3 is provided with a first processing unit 51, a second processing unit 53, a third processing unit 55, a fourth processing unit 57, a fifth processing unit 59, a sixth processing unit 61, and a seventh processing unit 63 as functions that are implemented by the CPU 31 executing programs.

A technique for implementing the first to seventh processing units 51 to 63 is not limited to software. Some or all elements thereof may be implemented by using hardware combined with a logical circuit or an analog circuit.

The first processing unit 51 calculates the current time to collision TTC on the basis of information obtained from the own vehicle information I/F 39, specifically, the distance (that is, the relative distance) between the preceding vehicle and the own vehicle and the relative speed between the preceding vehicle and the own vehicle.

The calculated time to collision TTC is stored in a memory such as the RAM 35 or the EEPROM 37 (the RAM 35 in this case, for example).

Further, in addition to the time to collision TTC as vehicle driving information, other pieces of vehicle driving information such as the vehicle speed of the preceding vehicle, deceleration start timing of the preceding vehicle, stop timing of the preceding vehicle, deceleration start timing of the own vehicle, the vehicle speed of the own vehicle, the relative speed, and the relative distance are also stored in the memory.

Figure 3:
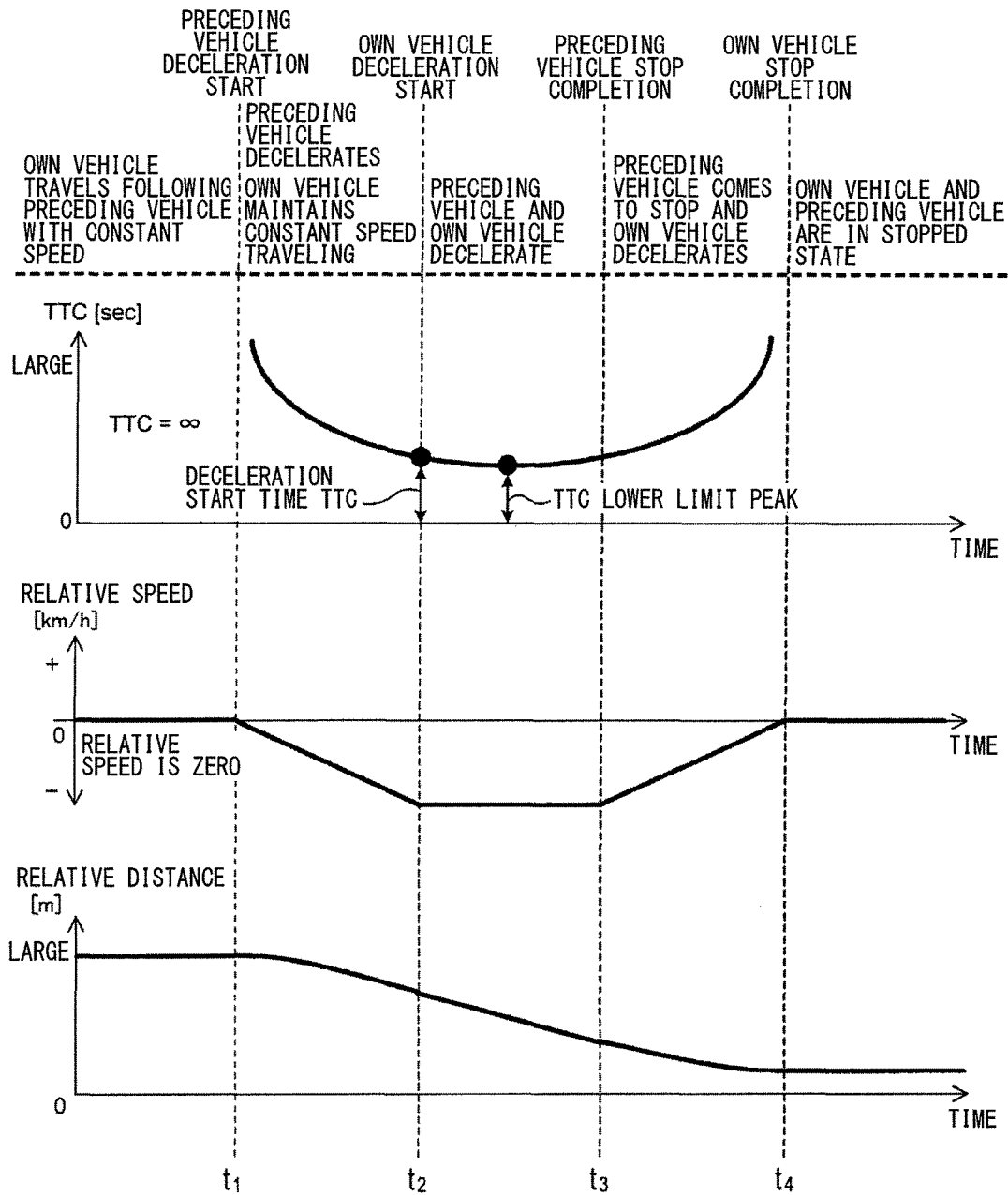
FIG. 3 is a graph illustrating changes with time of a time to collision, a relative speed, and a relative distance when a preceding vehicle decelerates and comes to a stop.

The second processing unit 53 grasps a deceleration start and a stop of the own vehicle on the basis of information from the own vehicle information I/F 39 and the first processing unit 51, for example, information from the vehicle speed sensor 9 and the brake switch 15 and extracts a temporal change in a vehicle driving state including the time to collision TTC from the deceleration start to the completion of the stop of the own vehicle. FIG. 3 (described below) illustrates the temporal change in a vehicle driving state.

That is, vehicle driving information from the deceleration to the stop is selected from the vehicle driving information stored in the memory.

The deceleration start of the own vehicle can be determined from information from the brake switch 15 on the basis of that the brake switch 15 which indicates a depression of the brake has been turned on. Further, the stop of the own vehicle can be determined from information from the vehicle speed sensor 9 on the basis of that the vehicle speed has become zero.

The own vehicle comes to a stop when the preceding vehicle comes to a stop. Thus, when the own vehicle has come to a stop, the preceding vehicle is also in a stopped state (the same applies to the following).

The third processing unit 55 extracts the time to collision TTC at a point in time when the own vehicle starts decelerating (that is, a deceleration start time TTC) on the basis of information from the second processing unit 53.

The fourth processing unit 57 extracts a minimum value that is a lower limit value of the time to collision TTC (that is, a TTC lower limit peak) in a time period from the deceleration start to the completion of the stop of the own vehicle on the basis of information from the second processing unit 53.

The fifth processing unit 59 calculates the average (that is, the average value) of the deceleration start time TTC as an index (that is, a first index) of a driving characteristic relating to safe driving on the basis of information from the third processing unit 55. Further, the fifth processing unit 59 calculates the average of the TTC lower limit peak as an index (that is, a second index) of the driving characteristic relating to safe driving on the basis of information from the fourth processing unit 57.

As described below, these averages are obtained as the latest average of the deceleration start time TTC and the latest average of the TTC lower limit peak by incorporating a deceleration start time TTC and a TTC lower limit peak which are calculated this time into the average of the deceleration start time TTC and the average of the TTC lower limit peak which have been stored in the memory (e.g., EEPROM 37) up to this time, respectively.

The sixth processing unit 61 stores the average of the deceleration start time TTC and the average of the TTC lower limit peak in the memory (e.g., EEPROM 37) and manages these averages on the basis of information from the fifth processing unit 59.

The seventh processing unit 63 performs a driving assistance determination on the basis of information from the own vehicle information I/F 39 and the second and sixth processing units 53, 61. Specifically, the seventh processing unit 63 determines whether to perform information notification for improving a driving action of the driver on the basis of a driving state of the own vehicle and the driving characteristic of the driver.

For example, as described below, each of the averages of the deceleration start time TTC and the TTC lower limit peak which are calculated as indices indicating the driving characteristic is compared with a reference value, for example, a value of the driving characteristic of an average driver. Then, for example, when the index of the driving characteristic of the driver of the own vehicle is largely deviated from the reference value, warning or advice can be performed on the basis of the comparison result.

1-3. Change in Time to Collision

Next, a change in the time to collision TTC and the status of the deceleration start time TTC and the TTC lower limit peak will be described.

Here, for example, description will be made with a typical example of "the own vehicle travels following the preceding vehicle·the preceding vehicle starts decelerating due to a red light or a stop sign·the own vehicle starts decelerating following the preceding vehicle·the own vehicle comes to a stop following the preceding vehicle."

As illustrated in FIG. 3, when the own vehicle is traveling with constant speed following the preceding vehicle, the time to collision TTC is infinity, the relative speed is 0, i.e., zero, and the relative distance also does not change.

Then, when the preceding vehicle starts decelerating at time t1 and the speed of the own vehicle does not change, the time to collision TTC gradually decreases. Further, the relative speed gradually decreases. For example, when the preceding vehicle decelerates with a nearly constant acceleration (that is, G), the relative speed decreases in a shape close to a linear line. Further, in this state, the relative distance decreases in a shape close to a quadratic curve.

Then, when the own vehicle starts decelerating at time t2, the preceding vehicle and the own vehicle both decelerate, and the time to collision TTC thus changes corresponding to the decelerations. The time to collision TTC at time t2 corresponds to the deceleration start time TTC.

In a period from time t2 to time t3 of the completion of a stop of the preceding vehicle, the time to collision TTC typically reaches the minimum value as the lower limit peak and then rises. The time to collision TTC at the lower limit peak corresponds to the TTC lower limit peak.

Further, when the own vehicle and the preceding vehicle decelerate with the same level of acceleration, the relative speed maintains a nearly constant value. Further, when the relative speed is nearly constant, the relative distance linearly decreases.

Then, when the preceding vehicle completes a stop at time t3, the own vehicle typically largely decelerates to avoid collision. Thus, the time to collision TTC rapidly rises in response to the large deceleration and approaches infinity as the time approaches time t4.

Further, when the own vehicle decelerates with a constant acceleration, the relative speed increases with a shape close to a linear line and returns to zero at time t4. Further, in this state, the relative distance decreases with a shape close to a quadratic curve and converges to a constant amount of following distance at time t4.

At time t4, the own vehicle is in a completely stopped state.

As described above, when the own vehicle comes to a stop following the preceding vehicle, the time to collision TTC changes. In the time to collision TTC, the deceleration start time TTC is the time to collision TTC at the timing when the driver starts a deceleration action.

That is, when the deceleration start time TTC is smaller than a predetermined first reference value (that is, satisfies a condition 1), for example, when the deceleration start time TTC is smaller than the average value in normal drivers, there is not much time to collision at a point in time when the deceleration is started, which means that the driver has started a deceleration action without sufficient time. Therefore, it is possible to determine that the driver with a small deceleration start time TTC has a driving characteristic slightly unreliable in safe driving, for example, a driving characteristic prone to cause an accident.

Similarly, the TTC lower limit peak represents a minimum value of the time to collision TTC.

That is, when the TTC lower limit peak is smaller than a predetermined second reference value (that is, satisfies a condition 2), for example, when the TTC lower limit peak is smaller than the average value in normal drivers, there is an extremely little time to collision, which means that the driver is not performing a deceleration action with sufficient time. Therefore, it is possible to determine that the driver with a small TTC lower limit peak has a driving characteristic slightly unreliable in safe driving.

1-4. Processing Contents in Driving Assistance Device

Next, control processing executed in the driving assistance device 3 will be described.

a) First, calculation processing of the time to collision TTC will be described.

This processing is, for example, processing in the first processing unit 51.

Figure 4:
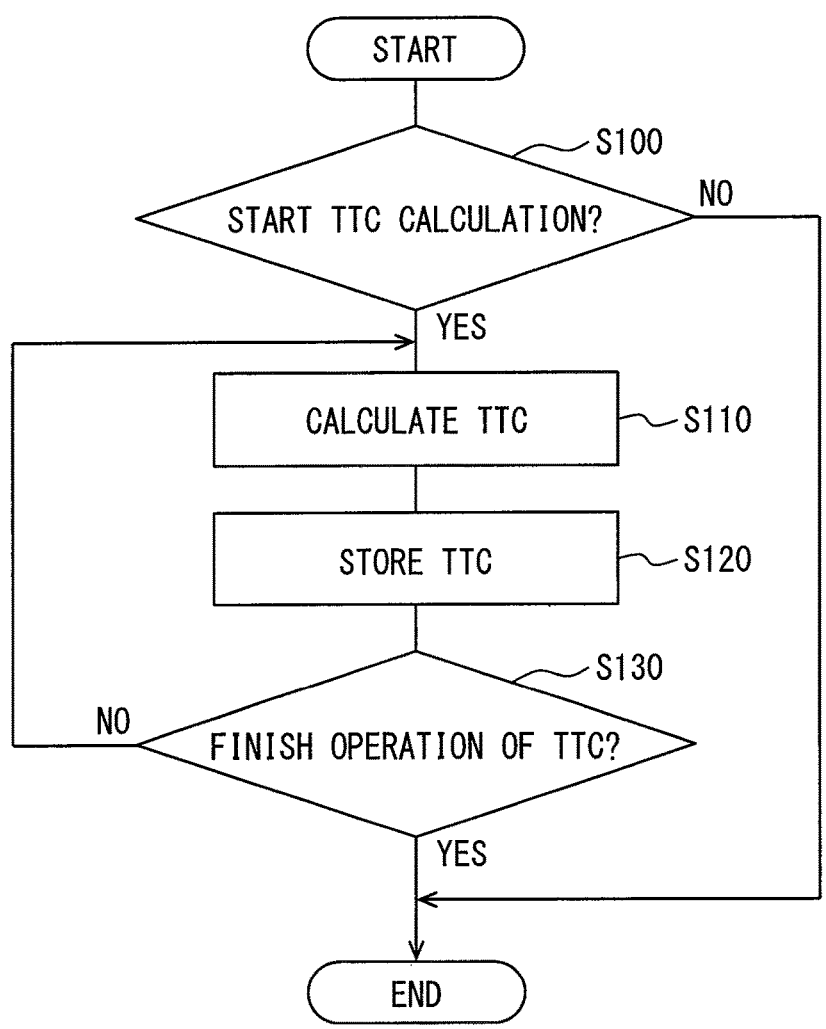
FIG. 4 is a flowchart illustrating processing of calculating the time to collision performed in the driving assistance device.

As illustrated in FIG. 4, in step (hereinbelow, referred to as "S") 100, it is determined whether to start calculation of the time to collision TTC. When affirmative determination is made, the processing proceeds to S110. On the other hand, when negative determination is made, the processing is temporarily finished.

For example, when the preceding vehicle is recognized, the calculation of the time to collision TTC is started. Here, the preceding vehicle is one of a plurality of targets detected by the radar device 5 that is determined to be traveling on the same lane as the own vehicle in front of (that is, immediately in front of) the own vehicle, that is, the vehicle followed by the own vehicle.

A process of recognizing the preceding vehicle followed by the own vehicle is a known process, for example, a known process performed in adaptive cruise control (that is, automatic cruise control) to travel following the preceding vehicle with a predetermined following distance maintained. Thus, description thereof will be omitted.

In S110, the time to collision TTC which changes with time is calculated by the above operation of "the relative distance/the relative speed" every predetermined time. That is, a change with time of the time to collision TTC is obtained.

In the following S120, the time to collision TTC calculated in S110 is stored in the memory (e.g., the RAM 35) together with time information thereof, that is, information indicating which time of data each time to collision TTC corresponds to.

In the following S130, it is determined whether to finish the calculation of the time to collision TTC. When affirmative determination is made, the processing returns to S110. On the other hand, when negative determination is made, the processing is temporarily finished.

For example, when the preceding vehicle has come to a stop, the calculation of the time to collision TTC is finished. The stop of the preceding vehicle can be determined on the basis of information from the radar device 5 indicating that the vehicle speed of the preceding vehicle has become zero.

Further, the memory also stores the other pieces of vehicle driving information described above together with the time information in addition to the time to collision TTC.

b) Next, calculation processing of the average of the deceleration start TTC and the average of the TTC lower limit peak will be described.

The processing is executed in the second to sixth processing units 53 to 61.

Figure 5:
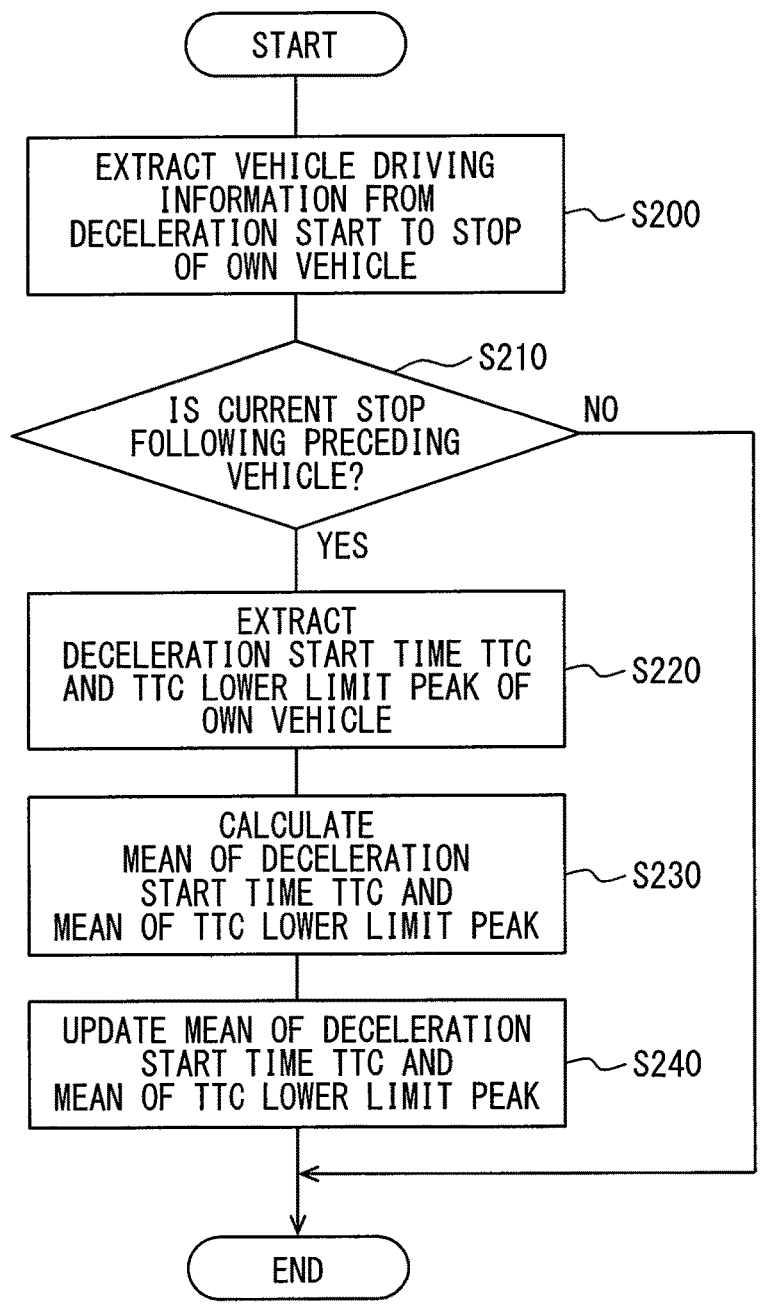
FIG. 5 is a flowchart illustrating processing of calculating the average of a deceleration start time TTC and the average of a TTC lower limit peak performed in the driving assistance device.

As illustrated in FIG. 5, in S200, vehicle driving information from the deceleration start to the stop of the own vehicle is extracted.

Specifically, the time to collision TTC from the deceleration start to the stop of the own vehicle is selected from information of the time to collision TTC stored in the memory by the processing illustrated in FIG. 4. At this time, information other than the time to collision TTC, for example, the time information and the other pieces of vehicle driving information are also extracted.

In the following S210, it is determined whether the current stop is a stop following the preceding vehicle. When affirmative determination is made, the processing proceeds to S220. On the other hand, when negative determination is made, the processing is temporarily finished.

Specifically, as described above, on the basis of information from the radar device 5, when a preceding vehicle that is recognized as a vehicle in front of (that is, immediately in front of) the own vehicle starts decelerating and the own vehicle decelerates and comes to a stop following the preceding vehicle thereafter, it is determined that "the current stop is a stop following the preceding vehicle".

It is necessary to follow the same preceding vehicle from the deceleration start to the stop, which can be grasped by continuously recognizing the preceding vehicle as the same target as used in known adaptive cruise control.

In S220, the deceleration start time TTC and the TTC lower limit peak of the own vehicle are extracted on the basis of data of the time to collision TTC extracted in S200 described above.

In the following S230, data of the deceleration start time TTC and the TTC lower limit peak extracted this time is added to calculate the average of the deceleration start time TTC and the average of the TTC lower limit peak of the own vehicle.

Specifically, the average of the deceleration start time TTC up to the previous time stored in the memory (e.g., EEPROM 37) is used, and the average of the deceleration start time TTC up to this time is obtained by an operation of "(the average of the deceleration start time TTC up to the previous time·the number of data items up to the previous time·the deceleration start time TTC of this time)/the total number of data items."

Similarly, the average of the TTC lower limit peak up to the previous time stored in the memory (e.g., EEPROM 37) is used, and the average of the TTC lower limit peak up to this time is obtained by an operation of "(the average of the TTC lower limit peak up to the previous time·the number of data items up to the previous time·the TTC lower limit peak of this time)/the total number of data items."

In the following S240, the average of the deceleration start time TTC and the average of the TTC lower limit peak stored in the memory (e.g., EEPROM 37) are updated with the average of the deceleration start time TTC and the average of the TTC lower limit peak of the own vehicle calculated this time as a new average of the deceleration start time TTC and a new average of the TTC lower limit peak, and the processing is temporarily finished.

c) Next, processing of performing assistance to the driver on the basis of the time to collision TTC will be described.

The processing is mainly performed in the seventh processing unit 63.

Figure 6:
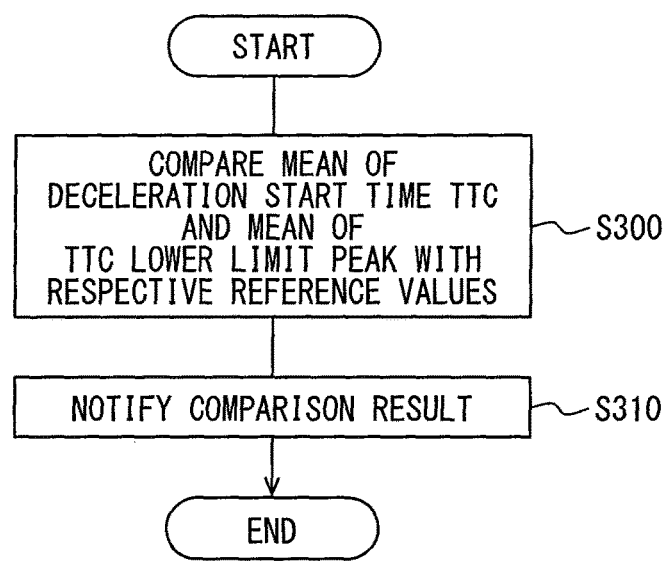
FIG. 6 is a flowchart illustrating processing for performing driving assistance to a driver.

As illustrated in FIG. 6, in S300, a process of comparing the average of the deceleration start time TTC obtained this time with the first reference value is performed. The first reference value is, for example, obtained in such a manner that the average of the deceleration start time TTC is obtained for each of a plurality of drivers in a manner similar to the processing of FIG. 5 described above, the overall average of the obtained averages (that is, the average of all the drivers) is further obtained, and a predetermined width having an upper limit value and a lower limit value is set around the overall average.

Similarly, a process of comparing the average of the TTC lower limit peak obtained this time with the second reference value is performed. The second reference value is, for example, obtained in such a manner that the average of the TTC lower limit peak is obtained for each of a plurality of drivers in a manner similar to the processing of FIG. 5 described above, the overall average of the obtained averages is further obtained, and a predetermined width having an upper limit value and a lower limit value is set around the overall average.

Further, each of the above reference values (that is, an index to be a reference) can be obtained by, for example, an experiment.

In the following S310, a process of notifying the driver of the comparison result in S300 is performed, and the processing is temporarily finished.

For example, when the average of the deceleration start time TTC is lower than the first reference value having the predetermined width and the average of the TTC lower limit peak is lower than the second reference value having the predetermined width, it is determined that a brake operation is slower or gentler than a normal operation and this fact (that is, the driving characteristic) is notified. Alternatively, advice such as "pay sufficient attention to safe driving" or "pay sufficient attention to collision" may be performed. That is, notification of information relating to the driving characteristic may be performed.

Further, when the average of the deceleration start time TTC is lower than the first reference value or when the average of the TTC lower limit peak is lower than the second reference value, it is determined that a brake operation is slightly slower or slightly gentler than the normal operation and this fact is notified. Alternatively, advice such as "pay attention to safe driving" or "pay attention to collision" may be performed.

That is, when the condition 1 and the condition 2 are satisfied, a level of the driving characteristic may be less preferable (that is, lower) than that in the case where the condition 1 or the condition 2 is satisfied. Thus, the degree of calling attention, that is, the degree of warning or advice is made stronger. In other words, the intensity of warning or advice is made larger.

1-5. Effects

According to the first embodiment described in detail above, the following effects can be obtained.

(1a) On the basis of the time to collision TTC after the own vehicle starts decelerating, specifically, the average of the deceleration start time TTC and the average of the TTC lower limit peak as indices of the driving characteristic are used and compared with the respective reference values.

Thus, it is possible to perform appropriate warning or advice to the driver on the basis of the comparison result.

Accordingly, the driver can pay more attention to safe driving. Thus, there is an effect that the safety during driving of the vehicle is largely improved.

(1b) Further, since the driving characteristic of the driver is determined on the basis of data of both of the average of the deceleration start time TTC and the average of the TTC lower limit peak, it is possible to determine the driving characteristic with high accuracy. Thus, there is an effect that it is possible to perform warning or advice with appropriate contents on the basis of the determination with high accuracy.

(1c) Further, when the average of the deceleration start time TTC and the average of the TTC lower limit peak are obtained, it is confirmed whether the current stop is a stop following the same preceding vehicle. Thus, there is an advantage that the accuracy of data is improved.

In the first embodiment described above, the second processing unit 53 and the process of S200 correspond to a deceleration detection unit of the present disclosure, the first and second processing units 51, 53 and the processes of S110, S200 correspond to an information calculation unit of the present disclosure, and the fifth processing unit 59 and the process of S230 correspond to an index calculation unit of the present disclosure.

Further, the process of S210 corresponds to a stop determination unit of the present disclosure, and the RAM 35, the sixth processing unit 61, and the process of S120 correspond to a storage unit of the present disclosure.

2. Second Embodiment

Next, a second embodiment will be described. Description of contents similar to the contents of the first embodiment will be omitted. Further, a configuration similar to that of the first embodiment is denoted by the same reference sign as that of the first embodiment.

In the second embodiment, driving assistance is performed using a third index and a fourth index (described below) as indices of the driving characteristic instead of the first index and the second index of the first embodiment.

That is, in the second embodiment, a time headway at the time of a deceleration start of the own vehicle (that is, a deceleration start time THW) is used as the third index. Further, a minimum value of the time headway (that is, a THW lower limit peak) is used as the fourth index.

As already known, the time headway, i.e., THW, is obtained by dividing the following distance by the vehicle speed of the own vehicle (own vehicle speed).

2-1. Functional Configuration of Driving Assistance Device

The second embodiment is provided with a driving assistance system 1 similar to that of the first embodiment. Further, a driving assistance device 3 as described below is provided.

Figure 7:
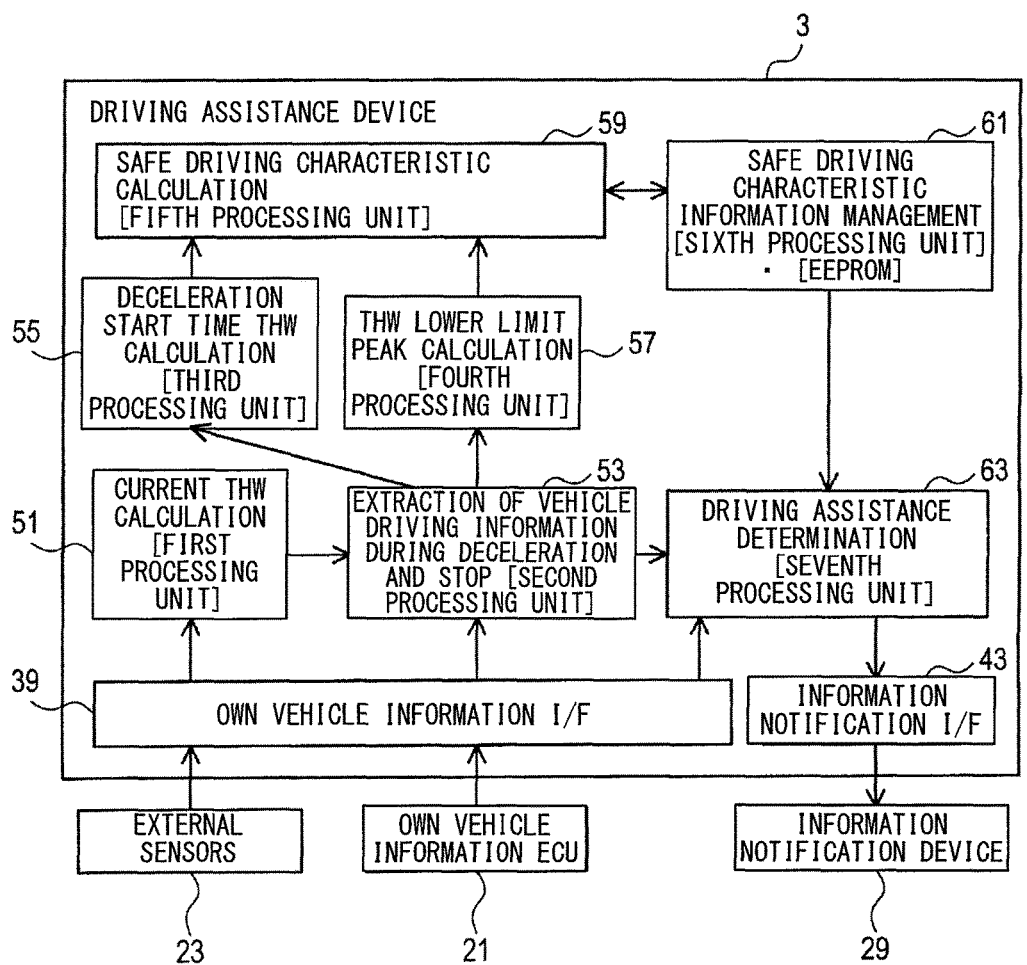
FIG. 7 is a block diagram functionally illustrating the configuration of a driving assistance device of a second embodiment.

As illustrated in FIG. 7, the driving assistance device 3 of the second embodiment is provided with a first processing unit 51, a second processing unit 53, a third processing unit 55, a fourth processing unit 57, a fifth processing unit 59, a sixth processing unit 61, and a seventh processing unit 63 as functions that are implemented by a CPU 31 executing programs.

A technique for implementing the first to seventh processing units 51 to 63 is not limited to software. Some or all elements thereof may be implemented by using hardware combined with a logical circuit or an analog circuit.

The first processing unit 51 calculates the current time headway THW on the basis of information obtained from an own vehicle information I/F 39, specifically, the distance between a preceding vehicle and the own vehicle (that is, the following distance as the relative distance) and the speed of the own vehicle.

The calculated time headway THW is stored in a memory such as a RAM 35 or an EEPROM 37 (the RAM 35 in this case, for example).

Further, in addition to the time headway THW as vehicle driving information, other pieces of vehicle driving information such as the vehicle speed of the preceding vehicle, deceleration start timing of the preceding vehicle, stop timing of the preceding vehicle, deceleration start timing of the own vehicle, the vehicle speed of the own vehicle, the relative speed, and the relative distance are also stored in the memory.

Figure 8:
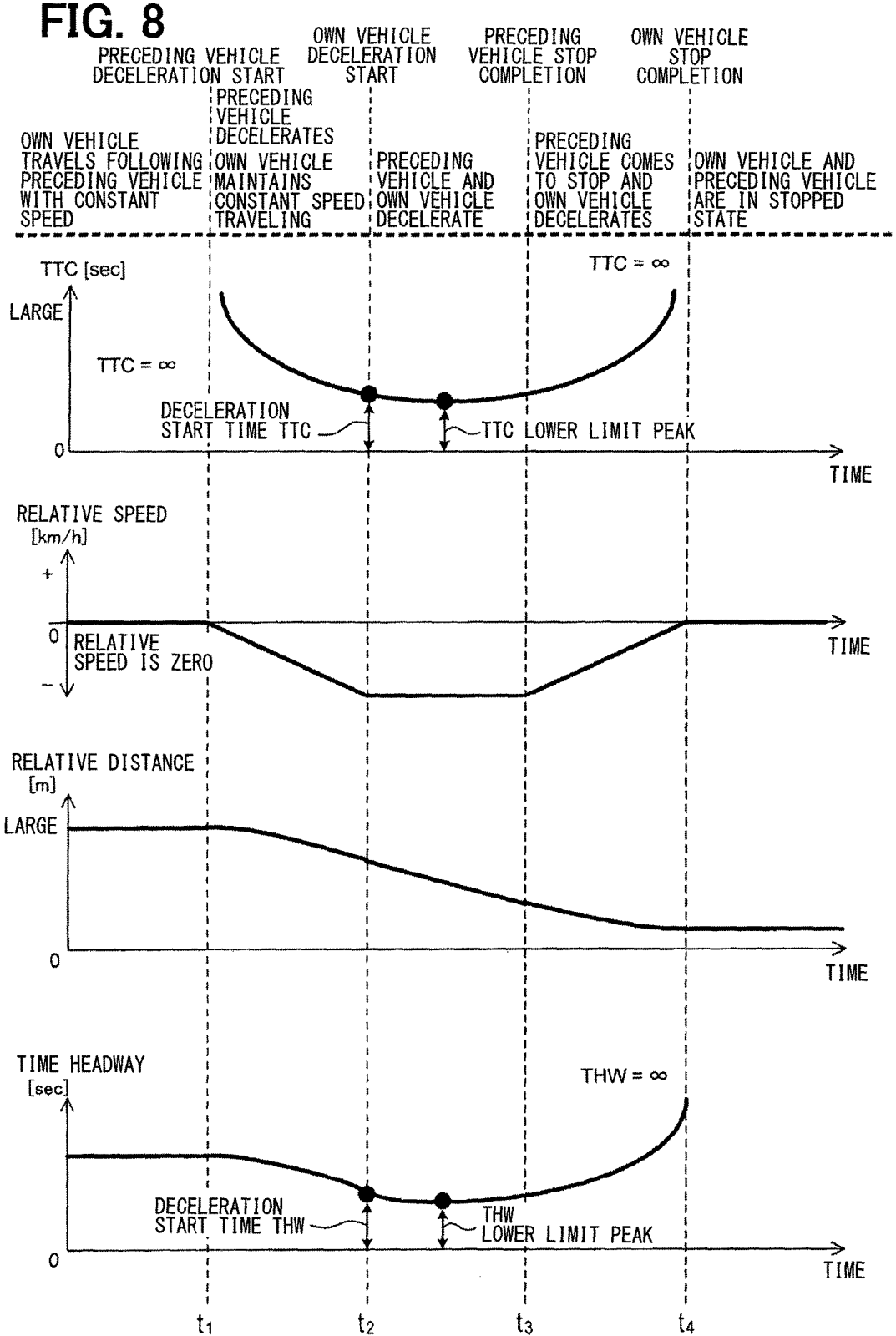
FIG. 8 is a graph illustrating changes with time of a time to collision, a relative speed, a relative distance, and a time headway when a preceding vehicle decelerates and comes to a stop.

The second processing unit 53 grasps a deceleration start and a stop of the own vehicle on the basis of information from the own vehicle information I/F 39 and the first processing unit 51, for example, information from a vehicle speed sensor 9 and a brake switch 15 and extracts a temporal change in a vehicle driving state including the time headway THW from the deceleration start to the completion of the stop of the own vehicle. FIG. 8 (described below) illustrates the temporal change in a vehicle driving state.

That is, vehicle driving information from the deceleration to the stop is selected from the vehicle driving information stored in the memory.

The third processing unit 55 extracts the time headway THW at a point in time when the own vehicle starts decelerating (that is, a deceleration start time THW) on the basis of information from the second processing unit 53.

The fourth processing unit 57 extracts a minimum value that is a lower limit value of the time headway THW (that is, a THW lower limit peak) in a time period from the deceleration start to the completion of the stop of the own vehicle on the basis of information from the second processing unit 53.

The fifth processing unit 59 calculates the average (that is, the average value) of the deceleration start time THW as an index (that is, a third index) of a driving characteristic relating to safe driving on the basis of information from the third processing unit 55.

Further, the fifth processing unit 59 calculates the average of the THW lower limit peak as an index (that is, a fourth index) of the driving characteristic relating to safe driving on the basis of information from the fourth processing unit 57.

As described below, these averages are obtained as the latest average of the deceleration start time THW and the latest average of the THW lower limit peak by incorporating a deceleration start time THW and a THW lower limit peak which are calculated this time into the average of the deceleration start time THW and the average of the THW lower limit peak which have been stored in the memory (e.g., EEPROM 37) up to this time, respectively.

The sixth processing unit 61 stores the average of the deceleration start time THW and the average of the THW lower limit peak in the memory (e.g., EEPROM 37) and manages these averages on the basis of information from the fifth processing unit 59.

The seventh processing unit 63 performs a driving assistance determination on the basis of information from the own vehicle information I/F 39 and the second and sixth processing units 53, 61. Specifically, the seventh processing unit 63 determines whether to perform information notification for improving a driving action of the driver on the basis of a driving state of the own vehicle and the driving characteristic of the driver.

For example, as described below, each of the averages of the deceleration start time THW and the THW lower limit peak which are calculated as indices indicating the driving characteristic is compared with a reference value, for example, a value of the driving characteristic of an average driver. Then, for example, when the index of the driving characteristic of the driver of the own vehicle is largely deviated from the reference value, warning or advice can be performed on the basis of the comparison result.

2-2. Change in Time Headway

Next, a change in the time headway THW and the status of the deceleration start time THW and the THW lower limit peak will be described.

Here, similarly to the first embodiment, for example, description will be made with a typical example of "the own vehicle travels following the preceding vehicle·the preceding vehicle starts decelerating due to a red light or a stop sign·the own vehicle starts decelerating following the preceding vehicle·the own vehicle comes to a stop following the preceding vehicle."

The time to collision TTC, the relative speed, and the relative distance are similar to those of the first embodiment as illustrated in FIG. 3. Thus, description thereof will be omitted.

As illustrated in the graph of the time headway of FIG. 8, when the own vehicle is traveling with constant speed following the preceding vehicle, the time headway THW is constant.

Then, when the preceding vehicle starts decelerating at time t1, the time headway THW decreases from a constant state.

Then, when the own vehicle starts decelerating at time t2, the preceding vehicle and the own vehicle both decelerate, and the time headway THW thus changes corresponding to the decelerations. The time headway THW at time t2 corresponds to the deceleration start time THW.

In a period from time t2 to time t3 of the completion of a stop of the preceding vehicle, the time headway THW typically reaches the minimum value as the lower limit peak and then rises. The time headway THW at the lower limit peak corresponds to the THW lower limit peak.

Then, when the preceding vehicle completes a stop at time t3, the own vehicle typically largely decelerates to avoid collision. Thus, the time headway THW rapidly rises in response to the deceleration and approaches infinity as the time approaches time t4 at which the own vehicle comes to a stop.

As described above, when the own vehicle comes to a stop following the preceding vehicle, the time headway THW changes. In the time headway THW, the deceleration start time THW is the THW at the timing when the driver starts a deceleration action.

That is, similarly to the time to collision TTC described above, when the deceleration start time THW is smaller than a predetermined third reference value (that is, satisfies a condition 3), for example, when the deceleration start time THW is smaller than the average value in normal drivers, there is not much time to collision at a point in time when the deceleration is started, which means that the driver has started a deceleration operation without sufficient time. Therefore, it is possible to determine that the driver with a small deceleration start time THW has a driving characteristic slightly unreliable in safe driving, for example, a driving characteristic prone to cause an accident.

Similarly, the THW lower limit peak represents a minimum value of the time headway THW.

That is, when the THW lower limit peak is smaller than a predetermined fourth reference value (that is, satisfies a condition 4), for example, when the THW lower limit peak is smaller than the average value in normal drivers, there is an extremely little time to collision, which means that the driver is not performing a deceleration action with sufficient time. Therefore, it is possible to determine that the driver with a small THW lower limit peak has a driving characteristic slightly unreliable in safe driving.

2-3. Control Contents

Next, processing of performing assistance to the driver on the basis of the time headway THW will be described.

Specifically, when the average of the deceleration start time THW is lower than the third reference value having a predetermined width (that is, satisfies the condition 3) and the average of the THW lower limit peak is lower than the fourth reference value having a predetermined width (that is, satisfies the condition 4), driving assistance is performed according to a state in which these conditions are satisfied.

a) First, calculation processing of the time headway THW will be described.

Figure 9:
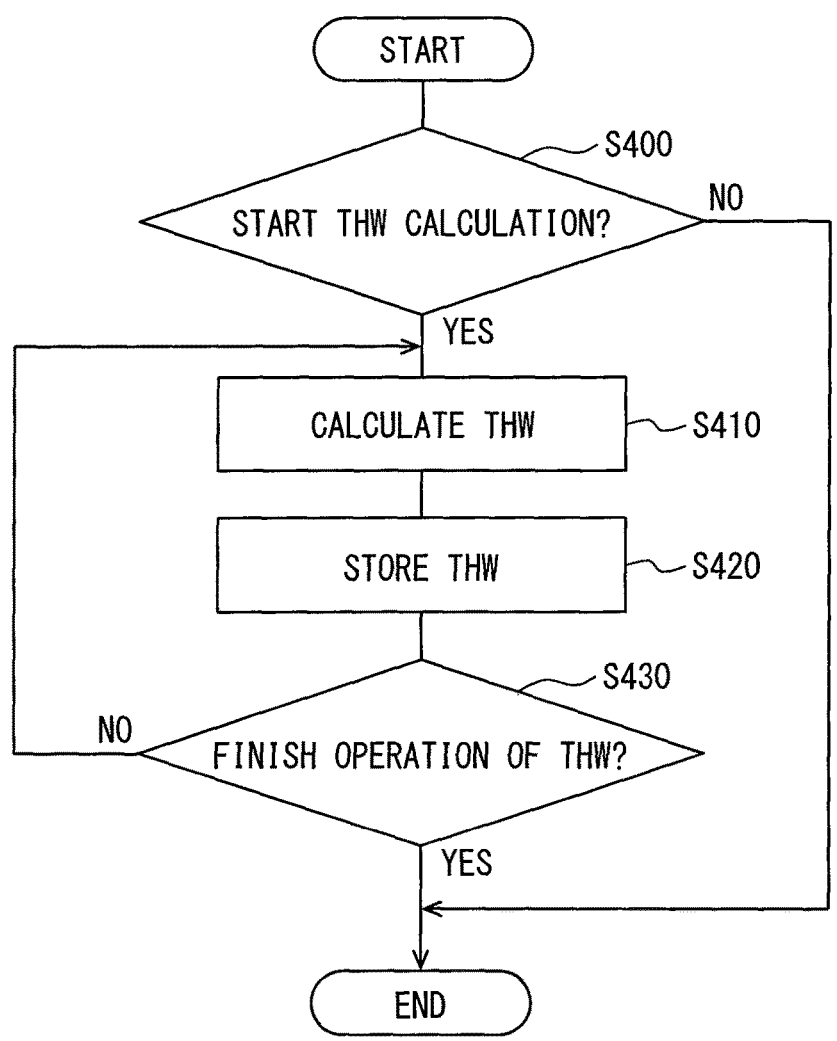
FIG. 9 is a flowchart illustrating processing of calculating the time headway performed in the driving assistance device.

As illustrated in FIG. 9, in step 400, it is determined whether to start calculation of the time headway THW. When affirmative determination is made, the processing proceeds to S410. On the other hand, when negative determination is made, the processing is temporarily finished.

For example, when the preceding vehicle is recognized, the calculation of the time headway THW is started.

In S410, the time headway THW which changes with time is calculated by an operation of "the relative distance (that is, the following distance)/the own speed" every predetermined time. That is, a change with time of the time headway THW is obtained.

In the following S420, the time headway THW calculated in S410 is stored in the memory (e.g., the RAM 35) together with time information thereof, that is, information indicating which time of data each time headway THW corresponds to.

In the following S430, it is determined whether to finish the calculation of the time headway THW. When affirmative determination is made, the processing returns to S410. On the other hand, when negative determination is made, the processing is temporarily finished.

For example, when the preceding vehicle has come to a stop, the calculation of the time headway THW is finished.

Further, the memory also stores the other pieces of vehicle driving information described above together with the time information in addition to the time headway THW.

b) Next, calculation processing of the average of the deceleration start THW and the average of the THW lower limit peak will be described.

Figure 10:
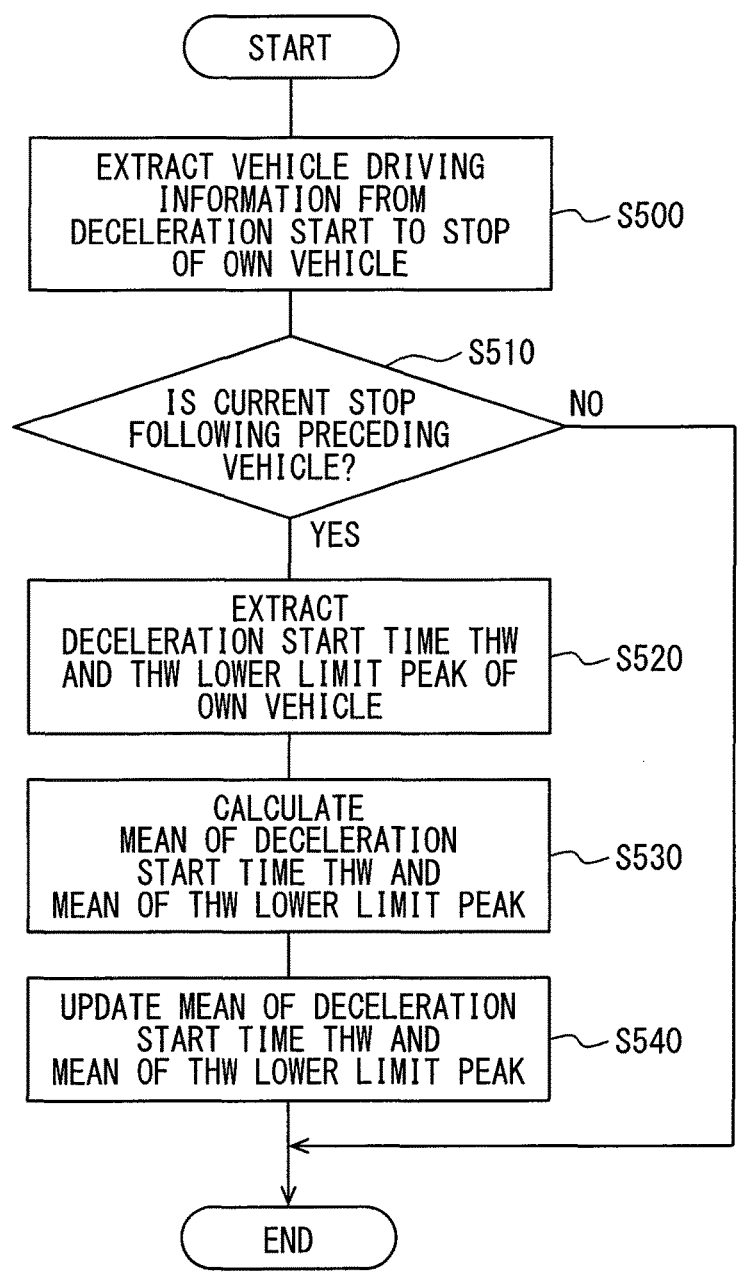
FIG. 10 is a flowchart illustrating processing of calculating the average of a deceleration start time THW and the average of a THW lower limit peak performed in the driving assistance device.

As illustrated in FIG. 10, in S500, vehicle driving information from the deceleration start to the stop of the own vehicle is extracted.

Specifically, the time headway THW from the deceleration start to the stop of the own vehicle is selected from information of the time headway THW stored in the memory by the processing illustrated in FIG. 9. At this time, information other than the time headway THW, for example, the time information and the other pieces of vehicle driving information are also extracted.

In the following S510, it is determined whether the current stop is a stop following the preceding vehicle. When affirmative determination is made, the processing proceeds to S520. On the other hand, when negative determination is made, the processing is temporarily finished.

In S520, the deceleration start time THW and the THW lower limit peak of the own vehicle are extracted on the basis of data of the time headway THW extracted in S500 described above.

In the following S530, data of the deceleration start time THW and the THW lower limit peak extracted this time is added to calculate the average of the deceleration start time THW and the average of the THW lower limit peak of the own vehicle. A method for obtaining the average value of the data is similar to that of the first embodiment.

In the following S540, the average of the deceleration start time THW and the average of the THW lower limit peak stored in the memory (e.g., EEPROM 37) are updated with the average of the deceleration start time THW and the average of the THW lower limit peak of the own vehicle calculated this time as a new average of the deceleration start time THW and a new average of the THW lower limit peak, and the processing is temporarily finished.

c) Next, processing of performing assistance to the driver on the basis of the time headway THW will be described.

Figure 11:
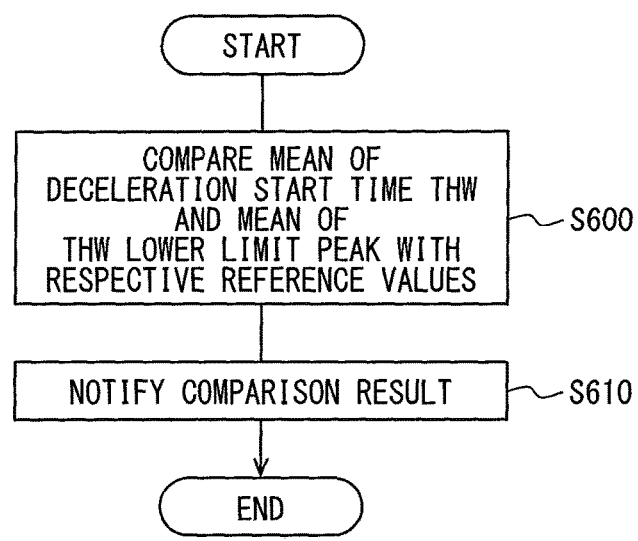
FIG. 11 is a flowchart illustrating processing for performing driving assistance to a driver.

As illustrated in FIG. 11, in S600, a process of comparing the average of the deceleration start time THW obtained this time with the third reference value is performed. The third reference value is, for example, obtained in such a manner that the average of the deceleration start time THW is obtained for each of a plurality of drivers in a manner similar to the processing of FIG. 10 described above, the overall average of the obtained averages (that is, the average of all the drivers) is further obtained, and a predetermined width having an upper limit value and a lower limit value is set around the overall average.

Similarly, a process of comparing the average of the THW lower limit peak obtained this time with the fourth reference value is performed. The fourth reference value is, for example, obtained in such a manner that the average of the THW lower limit peak is obtained for each of a plurality of drivers in a manner similar to the processing of FIG. 10 described above, the overall average of the obtained averages is further obtained, and a predetermined width having an upper limit value and a lower limit value is set around the overall average.

Further, each of the above reference values (that is, an index to be a reference) can be obtained by, for example, an experiment.

In the following S610, a process of notifying the driver of the comparison result in S600 is performed, and the processing is temporarily finished.

For example, when the average of the deceleration start time THW is lower than the third reference value having the predetermined width and the average of the THW lower limit peak is lower than the fourth reference value having the predetermined width, it is determined that a brake operation is slower or gentler than a normal operation and this fact (that is, the driving characteristic) is notified. Alternatively, advice such as "pay sufficient attention to safe driving" or "pay sufficient attention to collision" may be performed. That is, notification of information relating to the driving characteristic may be performed.

Further, when the average of the deceleration start time THW is lower than the third reference value or when the average of the THW lower limit peak is lower than the fourth reference value, it is determined that a brake operation is slightly slower or slightly gentler than the normal operation and this fact is notified. Alternatively, advice such as "pay attention to safe driving" or "pay attention to collision" may be performed.

That is, when the condition 3 and the condition 4 are satisfied, a level of the driving characteristic may be less preferable (that is, lower) than that in the case where the condition 3 or the condition 4 is satisfied. Thus, the degree of calling attention, that is, the degree of warning or advice is made stronger. In other words, the intensity of warning or advice is made larger.

2-3. Effects

According to the second embodiment described in detail above, the following effects can be obtained.

(2a) On the basis of the time headway THW after the own vehicle starts decelerating, specifically, the average of the deceleration start time THW and the average of the THW lower limit peak as indices of the driving characteristic are used and compared with the respective reference values. Thus, it is possible to perform appropriate warning or advice to the driver on the basis of the comparison result.

Accordingly, the driver can pay more attention to safe driving. Thus, there is an effect that the safety during driving of the vehicle is largely improved.

(2b) Further, since the driving characteristic of the driver is determined on the basis of data of both of the average of the deceleration start time THW and the average of the THW lower limit peak, it is possible to determine the driving characteristic with high accuracy. Thus, there is an effect that it is possible to perform warning or advice with appropriate contents on the basis of the determination with high accuracy.

(2c) Further, when the average of the deceleration start time THW and the average of the THW lower limit peak are obtained, it is confirmed whether the current stop is a stop following the same preceding vehicle. Thus, there is an advantage that the accuracy of data is improved.

In the second embodiment described above, the second processing unit 53 and the process of S500 correspond to the deceleration detection unit of the present disclosure, the first and second processing units 51, 53 and the processes of S410, S500 correspond to the information calculation unit of the present disclosure, and the fifth processing unit 59 and the process of S530 correspond to the index calculation unit of the present disclosure.

Further, the process of S510 corresponds to the stop determination unit of the present disclosure, and the RAM 35, the sixth processing unit 61, and the process of S420 correspond to the storage unit of the present disclosure.

3. Third Embodiment

Next, a third embodiment will be described. Description of contents similar to the contents of the first and second embodiments will be omitted. Further, a configuration similar to that of the first and second embodiments is denoted by the same reference sign as that of the first and second embodiments.

In the third embodiment, driving assistance is performed using a fifth index (described below) as an index of the driving characteristic instead of the first to fourth indices of the first and second embodiments.

That is, in the third embodiment, a following distance at the time of a stop of the own vehicle (that is, a stop time) is used as the fifth index.

As already known, the following distance is the interval (that is, the distance) between a preceding vehicle and the own vehicle.

3-1. Functional Configuration of Driving Assistance Device

The third embodiment is provided with a driving assistance system 1 similar to that of the first embodiment. Further, a driving assistance device 3 as described below is provided.

Figure 12:
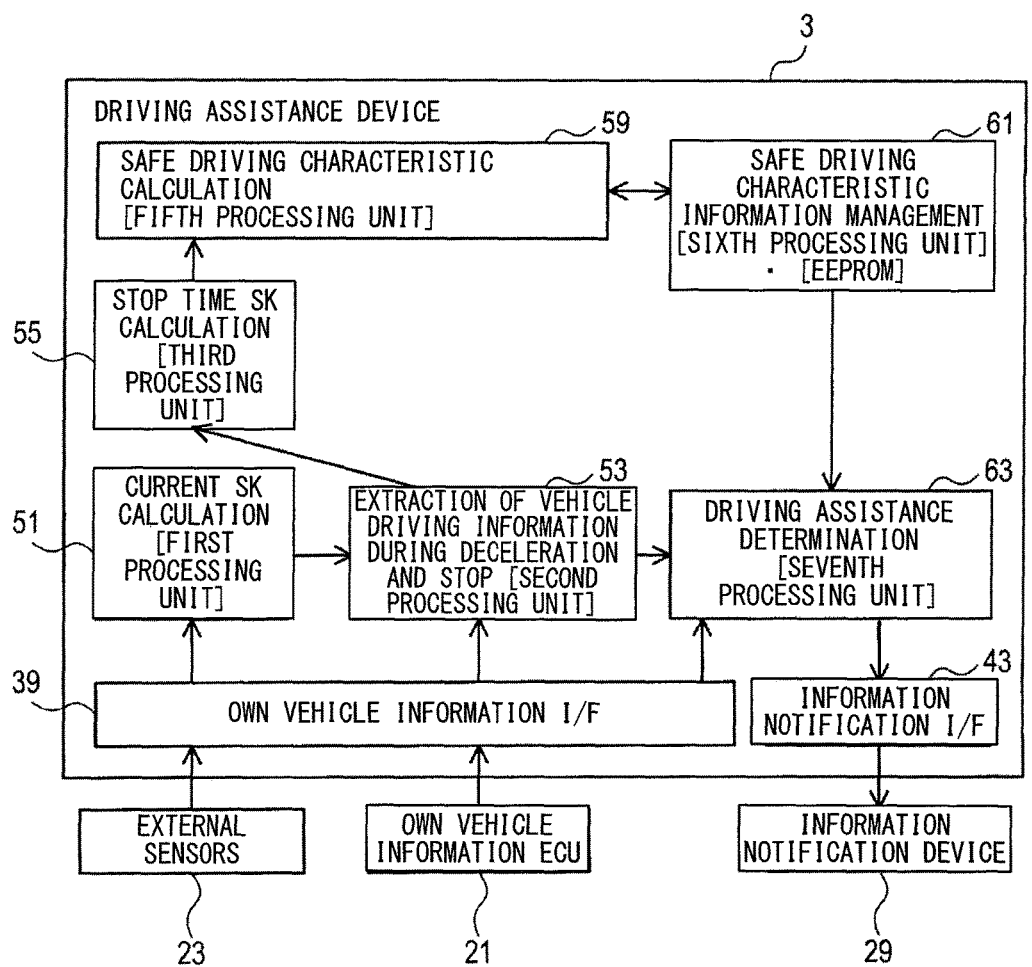
FIG. 12 is a block diagram functionally illustrating the configuration of a driving assistance device of a third embodiment.

As illustrated in FIG. 12, the driving assistance device 3 of the third embodiment is provided with a first processing unit 51, a second processing unit 53, a third processing unit 55, a fifth processing unit 59, a sixth processing unit 61, and a seventh processing unit 63 as functions that are implemented by a CPU 31 executing programs.

A technique for implementing the first to third processing units 51 to 55 and the fifth to seventh processing units 59 to 63 is not limited to software. Some or all elements thereof may be implemented by using hardware combined with a logical circuit or an analog circuit.

The first processing unit 51 calculates, specifically, the distance between the preceding vehicle and the own vehicle (that is, the relative distance: the following distance) SK on the basis of information obtained from an own vehicle information I/F 39.

The calculated following distance SK is stored in a memory such as a RAM 35 or an EEPROM 37 (the RAM 35 in this case, for example).

Further, in addition to the following distance SK as vehicle driving information, other pieces of vehicle driving information such as the vehicle speed of the preceding vehicle, deceleration start timing of the preceding vehicle, stop timing of the preceding vehicle, deceleration start timing of the own vehicle, the vehicle speed of the own vehicle, and the relative speed are also stored in the memory.

Figure 13:
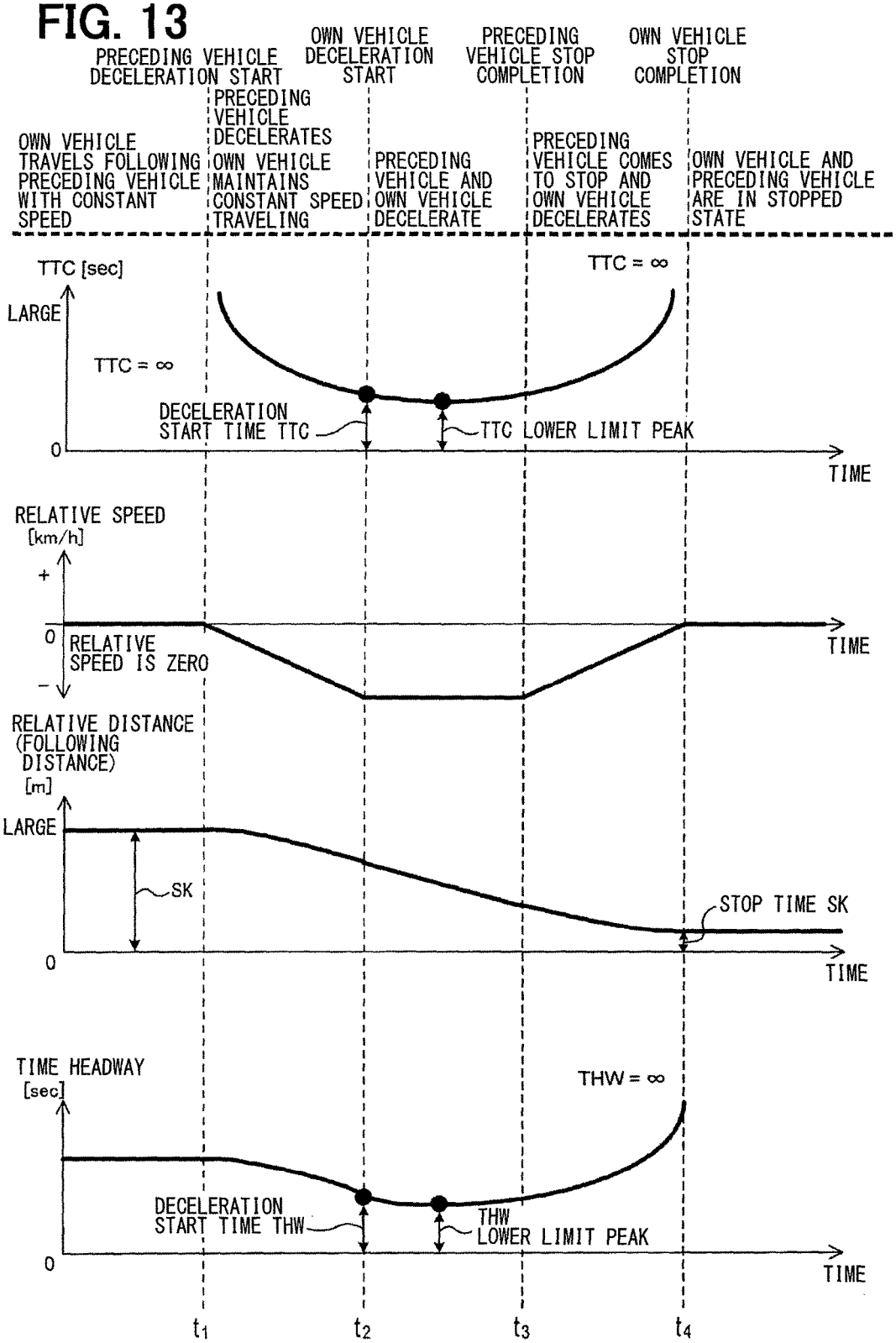
FIG. 13 is a graph illustrating changes with time of a time to collision, a relative speed, a relative distance, and a time headway when a preceding vehicle decelerates and comes to a stops.

The second processing unit 53 grasps a deceleration start and a stop of the own vehicle on the basis of information from the own vehicle information I/F 39 and the first processing unit 51, for example, information from a vehicle speed sensor 9 and a brake switch 15 and extracts a temporal change in a vehicle driving state including the following distance SK from the deceleration start to the completion of the stop of the own vehicle. FIG. 13 (described below) illustrates the temporal change in a vehicle driving state.

That is, vehicle driving information from the deceleration to the stop is selected from the vehicle driving information stored in the memory.

The third processing unit 55 extracts the following distance SK at a point in time when the own vehicle comes to a stop (that is, a stop time SK) on the basis of information from the second processing unit 53.

The fifth processing unit 59 calculates the average (that is, the average value) of the stop time SK as an index (that is, a fifth index) of the driving characteristic relating to safe driving on the basis of information from the third processing unit 55.

As described below, the average is obtained as the latest average of the stop time SK by incorporating a stop time SK calculated this time into the average of the stop time SK which has been stored in the memory (e.g., EEPROM 37) up to this time.

The sixth processing unit 61 stores the average of the stop time SK in the memory (e.g., EEPROM 37) and manages the average on the basis of information from the fifth processing unit 59.

The seventh processing unit 63 performs a driving assistance determination on the basis of information from the own vehicle information I/F 39 and the second and sixth processing units 53, 61. Specifically, the seventh processing unit 63 determines whether to perform information notification for improving a driving action of the driver on the basis of a driving state of the own vehicle and the driving characteristic of the driver.

For example, as described below, the average of the stop time SK calculated as an index indicating the driving characteristic is compared with a reference value, for example, a value of the driving characteristic of an average driver. Then, for example, when the index of the driving characteristic of the driver of the own vehicle is largely deviated from the reference value, warning or advice can be performed on the basis of the comparison result.

3-2. Change in Time Headway

Next, a change in the following distance SK and the status of the stop time SK will be described.

Here, similarly to the first embodiment, for example, description will be made with a typical example of "the own vehicle travels following the preceding vehicle·the preceding vehicle starts decelerating due to a red light or a stop sign·the own vehicle starts decelerating following the preceding vehicle·the own vehicle comes to a stop following the preceding vehicle."

The time to collision TTC, the relative speed, and the time headway are similar to those of the second embodiment as illustrated in FIG. 13. Thus, description thereof will be omitted.

As illustrated in the graph of the following distance of FIG. 13, when the own vehicle is traveling with constant speed following the preceding vehicle, the following distance SK is constant.

Then, when the preceding vehicle starts decelerating at time t1, the following distance SK decreases from a constant state.

Then, when the own vehicle starts decelerating at time t2, the preceding vehicle and the own vehicle both decelerate, and the following distance SK thus changes corresponding to the decelerations.

Also in a period from time t2 to time t3 of the completion of a stop of the preceding vehicle, the following distance SK typically decreases.

Then, also after the preceding vehicle completes a stop at time t3, the decrease in the time headway SK typically decreases as the time approaches time t4 at which the own vehicle comes to a stop.

Then, when the own vehicle comes to a stop at time t4, the following distance SK becomes a constant stop time SK.

Further, similarly to the time to collision TTC and the time headway THW described above, when the stop time SK is smaller than a predetermined fifth reference value (that is, satisfies a condition 5), for example, when the stop time SK is smaller than the average value in normal drivers, the driver is prone to come too close to the preceding vehicle. Therefore, it is possible to determine that the driver with a small stop time SK has a driving characteristic slightly unreliable in safe driving, for example, a driving characteristic prone to cause an accident.

3-3. Control Contents

Next, processing of performing assistance to the driver on the basis of the following distance SK will be described.

Specifically, when the average of the stop time SK is lower than the fifth reference value having a predetermined width, that is, satisfies the condition 5, driving assistance is performed according to a state in which the condition is satisfied.

a) First, calculation processing of the following distance SK will be described.

Figure 14:
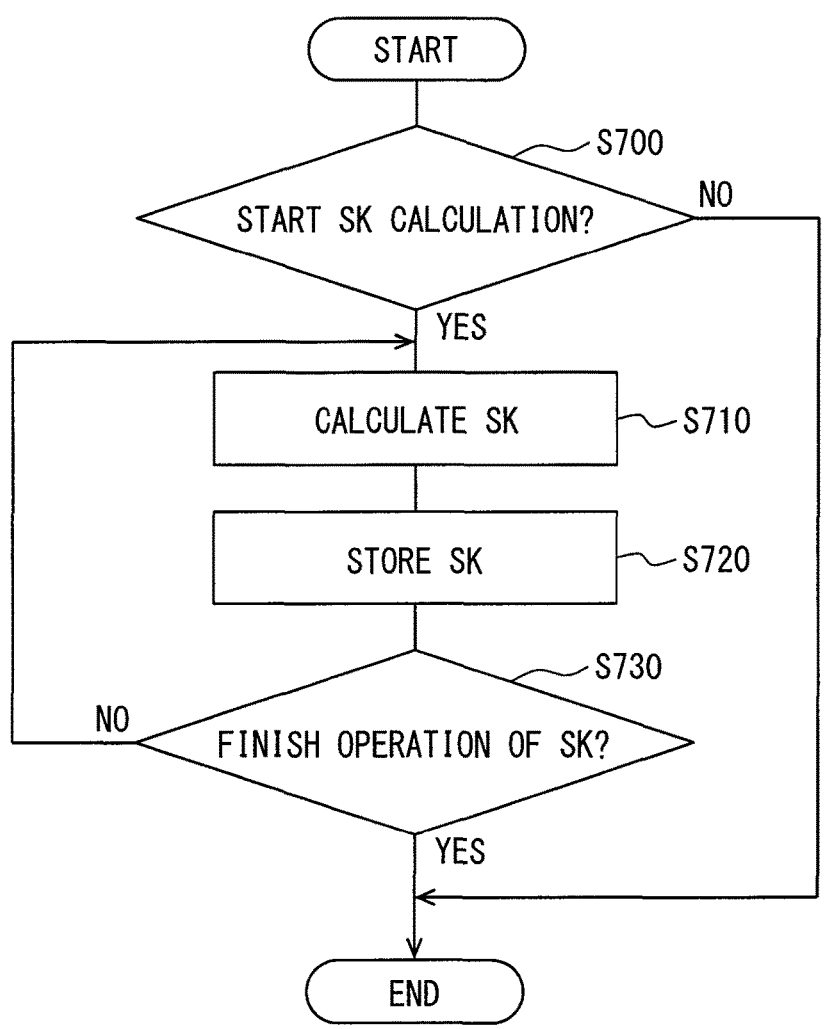
FIG. 14 is a flowchart illustrating processing of calculating a following distance performed in the driving assistance device.

As illustrated in FIG. 14, in step S700, it is determined whether to start calculation of the following distance SK. When affirmative determination is made, the processing proceeds to S710. On the other hand, when negative determination is made, the processing is temporarily finished.

For example, when the preceding vehicle is recognized, the calculation of the following distance SK is started.

In S710, the following distance SK which changes with time is calculated every predetermined time. That is, a change with time of the following distance SK is obtained.

In the following S720, the following distance SK calculated in S710 is stored in the memory (e.g., the RAM 35) together with time information thereof, that is, information indicating which time of data each following distance SK corresponds to.

In the following S730, it is determined whether to finish the calculation of the following distance SK. When affirmative determination is made, the processing returns to S710. On the other hand, when negative determination is made, the processing is temporarily finished.

For example, when the preceding vehicle has come to a stop, the calculation of the following distance SK is finished.

Further, the memory also stores the other pieces of vehicle driving information described above together with the time information in addition to the following distance SK.

b) Next, calculation processing of the average of the following distance SK will be described.

Figure 15:
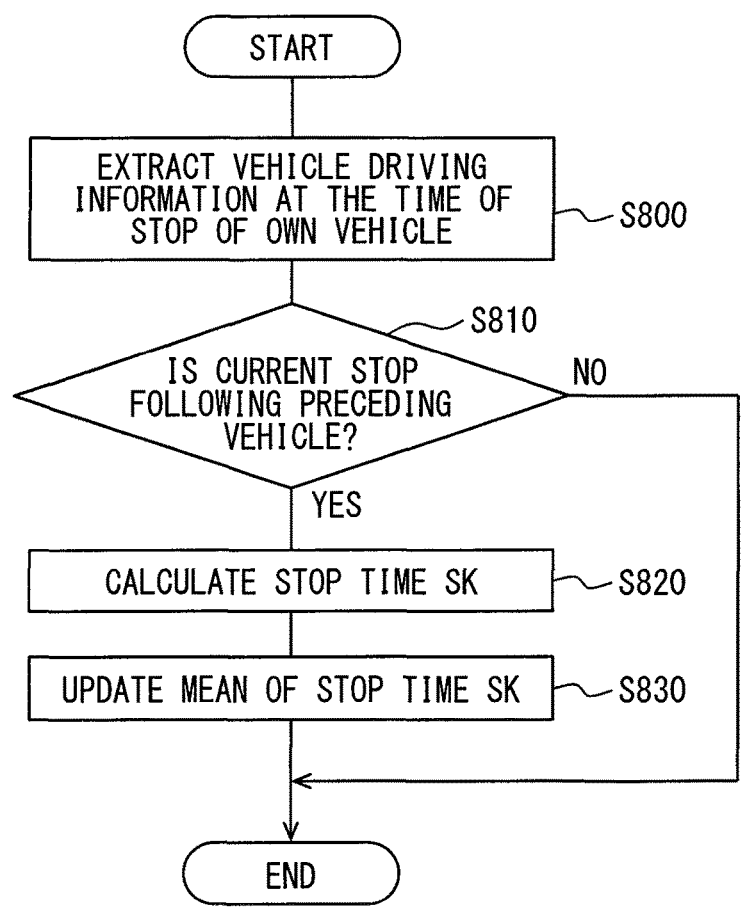
FIG. 15 is a flowchart illustrating processing of calculating the following distance TS at the time of a stop performed in the driving assistance device.

As illustrated in FIG. 15, in S800, vehicle driving information from the deceleration start to the stop of the own vehicle is extracted.

Specifically, the following distance SK at the time of the stop is selected from information of the following distance SK stored in the memory by the processing illustrated in FIG. 14. At this time, information other than the following distance SK, for example, the time information and the other pieces of vehicle driving information are also extracted.

In the following S810, it is determined whether the current stop is a stop following the preceding vehicle. When affirmative determination is made, the processing proceeds to S820. On the other hand, when negative determination is made, the processing is temporarily finished.

In S820, data of the stop time SK extracted this time is added to calculate the average of the stop time SK of the own vehicle. A method for obtaining the average value of the data is similar to that of the first embodiment.

In the following S830, the average of the stop time SK stored in the memory (e.g., EEPROM 37) is updated with the average of the stop time SK of the own vehicle calculated this time as a new average of the stop time SK, and the processing is temporarily finished.

c) Next, processing of performing assistance to the driver on the basis of the following distance SK will be described.

Figure 16:
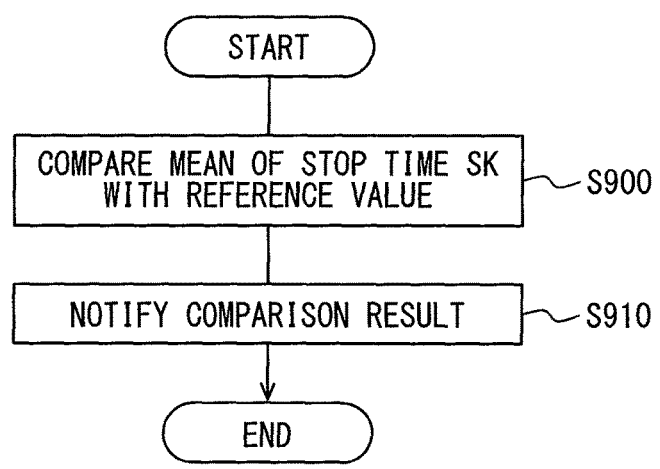
FIG. 16 is a flowchart illustrating processing for performing driving assistance to a driver.

As illustrated in FIG. 16, in S900, a process of comparing the average of the stop time SK obtained this time with the fifth reference value is performed.

The fifth reference value is, for example, obtained in such a manner that the average of the stop time SK is obtained for each of a plurality of drivers in a manner similar to the processing of FIG. 15 described above, the overall average of the obtained averages (that is, the average of all the drivers) is further obtained, and a predetermined width having an upper limit value and a lower limit value is set around the overall average.

Further, the above reference value (that is, an index to be a reference) can be obtained by, for example, an experiment.

In the following S910, a process of notifying the driver of the comparison result in S900 is performed, and the processing is temporarily finished.

For example, when the average of the stop time SK is lower than the fifth reference value having the predetermined width, it is determined that a brake operation is slightly gentler than a normal operation and this fact (that is, the driving characteristic) is notified. Alternatively, advice such as "pay attention to safe driving" or "pay attention to collision" may be performed.

3-3. Effects

According to the third embodiment described in detail above, the following effects can be obtained.

(3a) On the basis of the following distance SK after the own vehicle starts decelerating, specifically, the average of the stop time SK as an index of the driving characteristic is used and compared with the reference value. Thus, it is possible to perform appropriate warning or advice to the driver on the basis of the comparison result.

Accordingly, the driver can pay more attention to safe driving. Thus, there is an effect that the safety during driving of the vehicle is largely improved.

(3b) Further, since the driving characteristic of the driver is determined on the basis of the average of the stop time SK, it is possible to determine the driving characteristic with high accuracy. Thus, there is an effect that it is possible to perform warning or advice with appropriate contents on the basis of the determination with high accuracy.

(3c) Further, when the average of the stop time SK is obtained, it is confirmed whether the current stop is a stop following the same preceding vehicle. Thus, there is an advantage that the accuracy of data is improved.

In the second embodiment described above, the second processing unit 53 and the process of S800 correspond to the deceleration detection unit of the present disclosure, the first and second processing units 51, 53 and the processes of S710, S800 correspond to the information calculation unit of the present disclosure, and the fifth processing unit 59 and the process of S82 correspond to the index calculation unit of the present disclosure.

Further, the process of S810 corresponds to the stop determination unit of the present disclosure, and the RAM 35, the sixth processing unit 61, and the process of S720 correspond to the storage unit of the present disclosure.

4. Fourth Embodiment

Next, a fourth embodiment will be described. Description of contents similar to the contents of the first to third embodiments will be omitted. Further, a configuration similar to that of the first embodiment is denoted by the same reference sign as that of the first embodiment.

As an index of the driving characteristic, the first index and/or the second index is used in the first embodiment, the third index and/or the fourth index is used in the second embodiment, and the fifth index is used in the third embodiment. In the fourth embodiment, these first to fifth indices are used in a combined manner.

That is, in the fourth embodiment, assistance to the driver is performed on the basis of the time to collision TTC, the time headway THW, and the following distance SK.

Specifically, the case in which the average of the deceleration start time TTC is lower than the first reference value having the predetermined width (that is, the condition 1), the case in which the average of the TTC lower limit peak is lower than the second reference value having the predetermined width (that is, the condition 2), the case in which the average of the deceleration start time THW is lower than the third reference value having the predetermined width (that is, the condition 3), the case in which the average of the THW lower limit peak is lower than the fourth reference value having the predetermined width (that is, the condition 4), and the case in which the average of the stop time SK is lower than the fifth reference value having the predetermined width (that is, the condition 5) are taken into consideration, and driving assistance such as notification is performed according to a state in which some of these conditions 1 to 5 are satisfied.

There are various combinations of these conditions 1 to 5. In the fourth embodiment, for example, what kind of driving assistance is performed with respect to each of all the combinations of the conditions 1 to 5 is previously determined. Accordingly, it is possible to determine what kind of driving assistance is performed on the basis of the determined condition.

In this case, as anxiety for the driving characteristic (that is, the anxiety for the safety of driving) is larger, driving assistance for further improving the safety of driving is performed. For example, as anxiety for the safety is larger, stronger warning or advice is performed. That is, the intensity of driving assistance is increased.

Specifically, for example, a counter for determining the level (that is, the degree) of the driving characteristic, that is, a counter for determining the degree of driving assistance is provided. When the condition 1, the condition 2, the condition 3, the condition 4, and the condition 5 are satisfied, each counter value is set to 1.

As the sum of counter values is larger, the intensity of driving assistance is increased. That is, the level of calling attention with respect to the driver is raised.

Examples of a method for increasing the intensity of driving assistance include various methods as described below.

For example, when calling attention by notification such as warning or advice, the contents thereof are changed. For example, the level of calling attention is gradually raised such as "please pay attention to driving" ·"please do pay attention to driving" ·"please do pay sufficient attention to driving" ·"there is a slight fear in safe driving, please do pay sufficient attention to driving" ·"there is a fear in safe driving, please do pay sufficient attention to driving".

The frequency of notification is increased.

When notification is performed with sound, the volume of the sound is increased.

When notification is performed with characters, the size of the characters is increased and/or conspicuous color is used in the characters.

According to the above configuration, the fourth embodiment achieves effects similar to the effects of the first embodiment.

Further, in the fourth embodiment, driving assistance is performed taking many conditions 1 to 5 into consideration. Thus, it is possible to perform driving assistance with higher accuracy.

5. Other Embodiments

Embodiments of the present disclosure have been described above. However, the present disclosure is not limited to the above embodiments and may employ various modes within the technical scope of the present disclosure.

(5a) For example, in the first embodiment, the average of the deceleration start time TTC and the average of the TTC lower limit peak are calculated as indices of the driving characteristic, and the driving characteristic is determined on the basis of both of the indices. Alternatively, the driving characteristic may be determined by calculating only either the average of the deceleration start time TTC or the average of the TTC lower limit peak.

(5b) In the first embodiment, the average of the deceleration start time TTC and the average of the TTC lower limit peak are calculated, and the driving characteristic is determined on the basis of both of the indices. Alternatively, at least either the deceleration start time TTC or the TTC lower limit peak may be calculated as an index instead of the average, and the driving characteristic may be determined on the basis of the calculated index.

(5c) In the first embodiment, a minimum value of the time to collision TTC in stored past data may be used instead of the average such as the average of the deceleration start time TTC or the average of the TTC lower limit peak.

(5d) In the first embodiment, the deceleration start time TTC and the TTC lower limit peak are extracted when the indices are obtained. Alternatively, another time to collision TTC after the deceleration start may be extracted. For example, a time to collision TTC in the middle of a period from the deceleration start to the stop may be used because it is considered that the time to collision TTC after the deceleration start by the operation of the driver represents the driving characteristic of the driver at the time of braking.

(5e) In the first embodiment, for example, the time to collision TTC is obtained from the deceleration start of the preceding vehicle and stored in the memory. Alternatively, the time to collision TTC may be obtained from the deceleration start of the own vehicle after the deceleration start of the preceding vehicle and stored in the memory. The deceleration start time TTC and the TTC lower limit peak can be extracted on the basis of the data stored in the memory.

(5f) Further, in the second embodiment, the average of the deceleration start time THW and the average of the THW lower limit peak are calculated as indices of the driving characteristic, and the driving characteristic is determined on the basis of both of the indices. Alternatively, the driving characteristic may be determined by calculating only either the average of the deceleration start time THW or the average of the THW lower limit peak.

(5g) In the second embodiment, the average of the deceleration start time THW and the average of the THW lower limit peak are calculated, and the driving characteristic is determined on the basis of both of the indices. Alternatively, at least either the deceleration start time THW or the THW lower limit peak may be calculated as an index instead of the average, and the driving characteristic may be determined on the basis of the calculated index.

(5h) In the second embodiment, a minimum value of the time headway THW in stored past data may be used instead of the average such as the average of the deceleration start time THW and the average of the THW lower limit peak.

(5i) In the second embodiment, the deceleration start time THW and the THW lower limit peak are extracted when the indices are obtained. Alternatively, another time headway THW after the deceleration start may be extracted. For example, a time headway THW in the middle of a period from the deceleration start to the stop may be used because it is considered that the time headway THWC after the deceleration start by the operation of the driver represents the driving characteristic of the driver at the time of braking.

(5j) In the second embodiment, for example, the time headway THW is obtained from the deceleration start of the preceding vehicle and stored in the memory. Alternatively, the time headway THW may be obtained from the deceleration start of the own vehicle after the deceleration start of the preceding vehicle and stored in the memory. The deceleration start time THW and the THW lower limit peak can be extracted on the basis of the data stored in the memory.

(5k) Further, in the third embodiment, the average of the stop time SK is calculated as an index, and the driving characteristic is determined on the basis of the index. Alternatively, the stop time SK itself may be calculated as an index instead of the average, and the driving characteristic may be determined on the basis of the calculated index.

(5l) In the third embodiment, a minimum value of the stop time SK in stored past data may be used instead of the average of the stop time SK.

Specifically, in the third embodiment, the average of the stop SK is used as the fifth index. Alternatively, a minimum value in a plurality of pieces of data of the following distance (that is, the SK minimum value) may be used as a sixth index.

For example, when the sixth index is lower than a predetermined reference value (that is, a sixth reference value), warning or advice similar to that in the case of the fifth index may be performed.

Further, when the fifth index is lower than the fifth reference value and the sixth index is lower than the sixth reference value, that is, when the condition 5 and the condition 6 are satisfied, warning or advice stronger than that in the case of the fifth index, for example, warning or advice as in the case where the condition 1 and the condition 2 are satisfied may be performed.

(5m) In the third embodiment, for example, the following distance SK is obtained from the deceleration start of the preceding vehicle and stored in the memory. Alternatively, the following distance SK may be obtained from the deceleration start of the own vehicle after the deceleration start of the preceding vehicle and stored in the memory.

(5n) A function of one constituent element in each of the above embodiments may be distributed to a plurality of constituent elements, or functions of a plurality of constituent elements may be integrated to one constituent element. At least a part of the configuration of each of the above embodiments may be replaced with a known configuration having the same function. A part of the configuration of the above embodiments may be omitted. At least a part of the configuration of one of the above embodiments may be added to or replaced with the configuration of another one of the above embodiments.

(5o) In addition to the driving assistance device described above, the present disclosure can be implemented in various forms such as a system that includes the driving assistance device as a constituent element, one or more programs for causing a computer to function as the driving assistance device, one or more media that record at least part of the programs therein, and a method for performing driving assistance.

What is claimed is:

1. A driving assistance device comprising:
   a deceleration detection unit that detects a deceleration start by an operation of a driver of an own vehicle in a period from a deceleration to a stop of a preceding vehicle that travels in front of the own vehicle;
   an information calculation unit that obtains at least one type of front information including a time to collision until the own vehicle collides with the preceding vehicle, a time headway until the own vehicle reaches a position of the preceding vehicle, and a following distance between the own vehicle and the preceding vehicle when the own vehicle stops, after the deceleration start of the own vehicle; and
   an index calculation unit that obtains, based on the front information, an index indicating a driving characteristic that is a characteristic of a driving operation of the driver.

2. The driving assistance device according to claim 1, further comprising:
   a stop determination unit that, when the own vehicle stops, determines whether a stop of the own vehicle is a stop following the stop of the preceding vehicle, based on a feature whether the own vehicle follows the preceding vehicle in a period from the deceleration start to the stop of the own vehicle.

3. The driving assistance device according to claim 1, further comprising:
   a storage unit that stores the front information and vehicle driving information indicating a behavior of the preceding vehicle and a behavior of the own vehicle in a period from the deceleration start to a stop of the own vehicle.

4. The driving assistance device according to claim 1, wherein:
   the time to collision at a time of the deceleration start of the own vehicle is obtained; and
   the time to collision at the time of the deceleration start is used as the index of the driving characteristic.

5. The driving assistance device according to claim 4, wherein:
   after a plurality of deceleration starts of the own vehicle, the time to collision at the time of the deceleration start of the own vehicle in each of the deceleration starts is obtained;
   an average value of the time to collision at the time of the deceleration start of the own vehicle is obtained; and
   the average value of the time to collision is used as the index of the driving characteristic.

6. The driving assistance device according to claim 1, wherein:
   a minimum value of the time to collision is obtained; and
   the minimum value of the time to collision is used as the index of the driving characteristic.

7. The driving assistance device according to claim 6, wherein:
   after a plurality of deceleration starts of the own vehicle, a minimum value of the time to collision in each of the deceleration starts is obtained;
   an average value of the minimum value of the time to collision is obtained; and
   the average value of the time to collision is used as the index of the driving characteristic.

8. The driving assistance device according to claim 1, wherein:
   the time headway at the time of the deceleration start of the own vehicle is obtained; and
   the time headway at the time of the deceleration start is used as the index of the driving characteristic.

9. The driving assistance device according to claim 8, wherein:

after a plurality of deceleration starts of the own vehicle, the time headway at the time of the deceleration start of the own vehicle in each of the deceleration starts is obtained;

an average value of the time headway at the time of the deceleration start of the own vehicle is obtained; and the average value of the time to collision is used as the index of the driving characteristic.

10. The driving assistance device according to claim 1, wherein:

a minimum value of the time headway is obtained; and the minimum value of the time headway is used as the index of the driving characteristic.

11. The driving assistance device according to claim 10, wherein:

after a plurality of deceleration starts of the own vehicle, a minimum value of the time headway in each of the deceleration starts is obtained;

an average value of the minimum value of the time headway is obtained; and the average value of the time headway is used as the index of the driving characteristic.

12. The driving assistance device according to claim 1, wherein:

the following distance between the own vehicle and the preceding vehicle when the own vehicle stops is obtained; and the following distance at a time of a stop is used as the index of the driving characteristic.

13. The driving assistance device according to claim 12, wherein:

after a plurality of deceleration starts of the own vehicle, the following distance at the time of the stop of the own vehicle in each of the deceleration starts is obtained;

an average value of the following distance at the time of the stop of the own vehicle is obtained; and the average value of the following distance is used as the index of the driving characteristic.

14. The driving assistance device according to claim 1, wherein:

the index of the driving characteristic obtained based on the front information is compared with a reference index to determine the driving characteristic.

15. The driving assistance device according to claim 1, wherein:

the driver is notified of the driving characteristic or information relating to the driving characteristic.

* * * * *